United States Patent
Foucard

(10) Patent No.: US 12,223,677 B1
(45) Date of Patent: Feb. 11, 2025

(54) MAP-ANCHORED OBJECT DETECTION

(71) Applicant: Aurora Operations, Inc., Pittsburgh, PA (US)

(72) Inventor: Louis Foucard, San Francisco, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/354,415

(22) Filed: Jul. 18, 2023

(51) Int. Cl.
*G06T 7/73* (2017.01)
*B60W 60/00* (2020.01)

(52) U.S. Cl.
CPC ............. *G06T 7/74* (2017.01); *B60W 60/001* (2020.02); *B60W 2420/00* (2013.01); *B60W 2554/00* (2020.02); *B60W 2556/00* (2020.02); *G06T 2207/20081* (2013.01); *G06T 2207/30204* (2013.01); *G06T 2207/30256* (2013.01)

(58) Field of Classification Search
CPC ... G06T 7/73; G06T 7/74; G06T 2207/20081; G06T 2207/30204; G06T 2207/30256; B60W 60/001; B60W 2554/00; B60W 2556/00; B60W 2420/00
USPC .......................................................... 701/27
See application file for complete search history.

(56) References Cited

U.S. PATENT DOCUMENTS

| | | | | |
|---|---|---|---|---|
| 11,209,820 B2* | 12/2021 | Isele | ..................... | G05D 1/0289 |
| 11,738,772 B1* | 8/2023 | Beller | ................... | B60W 30/09 701/26 |
| 2018/0340790 A1* | 11/2018 | Kislovskiy | ......... | G01C 21/3484 |
| 2018/0341261 A1* | 11/2018 | Kislovskiy | ............. | G06N 20/00 |
| 2018/0341888 A1* | 11/2018 | Kislovskiy | ....... | G08G 1/096838 |
| 2018/0365533 A1* | 12/2018 | Sathyanarayana | ...... | G06F 18/24 |
| 2019/0354782 A1* | 11/2019 | Kee | ........................ | G06F 18/217 |
| 2020/0027241 A1 | 1/2020 | Tong et al. | | |
| 2020/0159225 A1* | 5/2020 | Zeng | ..................... | G05D 1/0088 |
| 2020/0409358 A1* | 12/2020 | Gogna | ................. | G05D 1/0061 |
| 2021/0150230 A1* | 5/2021 | Smolyanskiy | ....... | G06V 10/764 |
| 2021/0158696 A1* | 5/2021 | McNew | ................. | G08G 1/207 |
| 2021/0181758 A1* | 6/2021 | Das | ..................... | G06V 30/2552 |

(Continued)

FOREIGN PATENT DOCUMENTS

| | | | | |
|---|---|---|---|---|
| AU | 2024202759 A1 * | 5/2024 | ............. | A61B 3/103 |
| CN | 117274944 A * | 12/2023 | ........... | G06N 3/0464 |

(Continued)

OTHER PUBLICATIONS

International Search Report and Written Opinion for Application No. PCT/US2023/086418, mailed Apr. 30, 2024, 10 pages.

(Continued)

*Primary Examiner* — Atul Trivedi
(74) *Attorney, Agent, or Firm* — Dority & Manning, P.A.

(57) ABSTRACT

An example method includes (a) obtaining sensor data descriptive of an environment of an autonomous vehicle; (b) obtaining a plurality of travel way markers from map data descriptive of the environment; (c) determining, using a machine-learned object detection model and based on the sensor data, an association between one or more travel way markers of the plurality of travel way markers and an object in the environment; and (d) generating, using the machine-learned object detection model, an offset with respect to the one or more travel way markers of a spatial region of the environment associated with the object.

21 Claims, 11 Drawing Sheets

(56) References Cited

U.S. PATENT DOCUMENTS

| | | | |
|---|---|---|---|
| 2021/0182609 A1* | 6/2021 | Arar | G06V 20/597 |
| 2021/0197858 A1* | 7/2021 | Zhang | G08G 1/161 |
| 2021/0208273 A1 | 7/2021 | Yu et al. | |
| 2021/0253128 A1* | 8/2021 | Nister | B60W 60/0027 |
| 2021/0287459 A1* | 9/2021 | Cella | G07C 5/0808 |
| 2021/0383533 A1* | 12/2021 | Zhao | G06V 20/64 |
| 2022/0001892 A1* | 1/2022 | Fairley | G06N 20/10 |
| 2022/0051017 A1* | 2/2022 | Choi | G06V 10/764 |
| 2022/0114888 A1 | 4/2022 | Napanda et al. | |
| 2022/0138568 A1* | 5/2022 | Smolyanskiy | G06N 3/044 706/21 |
| 2022/0144304 A1* | 5/2022 | Ehsanibenafati | G06V 20/588 |
| 2022/0164602 A1* | 5/2022 | Frtunikj | G06V 20/58 |
| 2022/0188695 A1* | 6/2022 | Zhu | G06N 20/00 |
| 2022/0230021 A1* | 7/2022 | Muehlenstaedt | G06F 18/2411 |
| 2022/0289180 A1* | 9/2022 | Casas | G06N 3/045 |
| 2022/0379913 A1* | 12/2022 | Rodriguez Hervas | B60W 60/001 |
| 2023/0020135 A1* | 1/2023 | Ferguson | G08G 5/0043 |
| 2023/0037767 A1* | 2/2023 | Yang | G08G 1/167 |
| 2023/0049567 A1* | 2/2023 | Popov | G06N 7/01 |
| 2023/0054759 A1* | 2/2023 | Robinson | G01S 17/931 |
| 2023/0099494 A1* | 3/2023 | Kocamaz | G06V 20/58 382/103 |
| 2023/0112004 A1* | 4/2023 | Hari | G06F 11/3457 701/23 |
| 2023/0192141 A1* | 6/2023 | Zhang | G06V 10/25 |
| 2023/0229889 A1* | 7/2023 | Urtasun | G06N 3/084 701/25 |
| 2023/0258794 A1* | 8/2023 | Karrman | G01S 7/411 702/150 |
| 2023/0286539 A1* | 9/2023 | Malloch | G06N 3/096 |
| 2023/0296758 A1* | 9/2023 | Akbarzadeh | G01S 13/867 382/104 |
| 2023/0298361 A1* | 9/2023 | Yang | G06V 20/588 382/104 |
| 2023/0324194 A1* | 10/2023 | Akbarzadeh | G01C 21/3415 701/117 |
| 2023/0351638 A1* | 11/2023 | Wu | G06V 10/25 |
| 2023/0351769 A1* | 11/2023 | Wu | G06V 10/762 |
| 2023/0386323 A1* | 11/2023 | Georgiou | G01C 21/3811 |
| 2023/0388481 A1* | 11/2023 | Yin | G06T 7/60 |
| 2024/0020968 A1* | 1/2024 | Haskin | G06F 16/29 |
| 2024/0043040 A1* | 2/2024 | Liu | B60W 30/0956 |
| 2024/0126268 A1* | 4/2024 | Yang | G05D 1/0248 |
| 2024/0127579 A1* | 4/2024 | Capellier | G05D 1/0274 |
| 2024/0220675 A1* | 7/2024 | Aghaei | G06F 30/20 |

FOREIGN PATENT DOCUMENTS

| | | | | |
|---|---|---|---|---|
| EP | 3623761 A1 | | 3/2020 | |
| GB | 2610663 A | * | 3/2023 | B60W 30/0956 |
| GB | 2612857 A | * | 5/2023 | B60R 21/0153 |
| KR | 20210030136 A | | 3/2021 | |
| WO | WO-2023126914 A2 | * | 7/2023 | |
| WO | WO-2023235094 A1 | * | 12/2023 | B60W 50/00 |

OTHER PUBLICATIONS

Aurora Blog. "FMCW lidar: The self-driving game-changer", 2020. 6 pgs.

Aurora Blog, "Continuous real-time sensor recalibration: A long-range perception game-changer", Mar. 15, 2023, https://blog.aurora.tech/engineering/continuous-real-time-sensor-recalibration, retrieved on May 2, 2024, 8 pages.

Bertoni, et al. "MonoLoco: Monocular 3d Pedestrian Localization and Uncertainty Estimation", https://openaccess.thecvf.com/content_ICCV_2019/papers/Bertoni_MonoLoco_Monocular_3D_Pedestrian_Localization_and_Uncertainty_Estimation_ICCV_2019_paper.pdf, 2019. 11 pgs.

California Department of Transportation. "Move over. It's the law." News Release. https://dot.ca.gov/news-releases/news-release-2019-080. Oct. 16, 2019. 2 pgs.

Casas, et al. "Intentnet: Learning to predict intention from raw sensor data." Proceedings of Machine Learning Research, Oct. 29-31, 2018. https://proceedings.mlr.press/v87/casas18a/casas18a.pdf. 10 pgs.

Chen, et al. "Multi-View 3D Object Detection Network for Autonomous Driving." https://arxiv.org/pdf/1611.07759, Jun. 22, 2017. 9 pgs.

Federal Motor Carrier Safety Administration. "Long stopping distances", federal motor carrier safety administration. Video. https://www.fmcsa.dot.gov/ourroads/, 2022.

Ku et al. "Joint 3D Proposal Generation and Object Detection from View Aggregation" https://arxiv.org/pdf/1712.02294, Jul. 12, 2018. 8 pgs.

Lang et al. "PointPillars: Fast Encoders for Object Detection From Point Clouds" https://openaccess.thecvf.com/content_CVPR_2019/papers/Lang_PointPillars_Fast_Encoders_for_Object_Detection_From_Point_Clouds_CVPR_2019_paper.pdf. 2019, 9 pgs.

Li et al. "GS3D: An Efficient 3D Object Detection Framework for Autonomous Driving" https://arxiv.org/pdf/1903.10955. Mar. 27, 2019. 9 pgs.

Liang et al. "BEVFusion: A Simple and Robust LiDAR-Camera Fusion Framework" https://arxiv.org/pdf/2205.13790. Nov. 11, 2022. 17 pgs.

Liang et al. "Deep Continuous Fusion for Multi-Sensor 3D Object Detection" https://arxiv.org/pdf/2012.10992. Dec. 20, 2020. 16 pgs.

Liang et al. "Multi-Task Multi-Sensor Fusion for 3D Object Detection" https://arxiv.org/pdf/2012.12397. Dec. 22, 2020. 11 pgs.

Liang et al. "PnPNet: End-to-End Perception and Prediction with Tracking in the Loop" https://openaccess.thecvf.com/content_CVPR_2020/papers/Liang_PnPNet_End-to-End_Perception_and_Prediction_With_Tracking_in_the_Loop_CVPR_2020_paper.pdf. 2020. 10 pgs.

Luo et al. "Fast and Furious: Real Time End-to-End 3D Detection, Tracking and Motion Forecasting with a Single Convolutional Net" https://arxiv.org/pdf/2012.12395. Dec. 22, 2020. 9 pgs.

Meyer et al. "Lasernet: An Efficient Probabilistic 3D Object Detector for Autonomous Driving" https://arxiv.org/pdf/1903.08701. Mar. 20, 2019. 10 pgs.

Meyer et al. "Sensor Fusion for Joint 3D Object Detection and Semantic Segmentation" https://arxiv.org/pdf/1904.11466. Apr. 25, 2019. 8 pgs.

Mousavian et al. "3D Bounding Box Estimation Using Deep Learning and Geometry" https://arxiv.org/pdf/1612.00496. Apr. 10, 2017. 10 pgs.

Pfeuffer et al. "Robust Semantic Segmentation in Adverse Weather Conditions by means of Sensor Data Fusion" https://arxiv.org/pdf/1905.10117. May 24, 2019. 8 pgs.

Pierrottet et al. "Linear FMCW Laser Radar for Precision Range and Vector Velocity Measurements" https://ntrs.nasa.gov/api/citations/20080026181/downloads/20080026181.pdf. 9 pgs.

Qi et al. "PointNet: Deep Learning on Point Sets for 3D Classification and Segmentation" https://arxiv.org/pdf/1612.00593. Apr. 10, 2017. 19 pgs.

Qi et al. "PointNet++: Deep Hierarchical Feature Learning on Point Sets in a Metric Space" https://arxiv.org/pdf/1706.02413. Jun. 7, 2017. 14 pgs.

Qin et al. "MonoGRNet: A Geometric Reasoning Network for Monocular 3D Object Localization" https://arxiv.org/pdf/1811.10247. Mar. 31, 2020. 9 pgs.

Qin et al. "Triangulation Learning Network: from Monocular to Stereo 3D Object Detection" https://arxiv.org/pdf/1906.01193. Jun. 4, 2019. 9 pgs.

Shi et al. "PointRCNN: 3D Object Proposal Generation and Detection from Point Cloud" https://arxiv.org/pdf/1812.04244. May 16, 2019. 10 pgs.

Vora et al. "PointPainting: Sequential Fusion for 3D Object Detection" https://arxiv.org/pdf/1911.10150. May 6, 2020. 11 pgs.

Wang et al. "Deep Parametric Continuous Convolutional Neural Networks" https://arxiv.org/pdf/2101.06742. Jan. 17, 2021. 18 pgs.

Wang et al. "Pseudo-LiDAR from Visual Depth Estimation: Bridging the Gap in 3D Object Detection for Autonomous Driving" https://arxiv.org/pdf/1812.07179. Feb. 22, 2020. 16 pgs.

(56) References Cited

OTHER PUBLICATIONS

Xu et al. "Multi-Level Fusion based 3D Object Detection from Monocular Images" https://openaccess.thecvf.com/content_cvpr_2018/papers/Xu_Multi-Level_Fusion_Based_CVPR_2018_paper.pdf. Jun. 2018. 9 pgs.
Yang et al. "HDNET:Exploiting HD Maps for 3D Object Detection" https://arxiv.org/pdf/2012.11704. Dec. 21, 2020. 10 pgs.
Zhou et al. "Objects as Points" https://arxiv.org/pdf/1904.07850. Apr. 25, 2019. 12 pgs.
Zhou et al. "Voxelnet: End-to-end learning for point cloud based 3d object detection" https://arxiv.org/pdf/1711.06396, Nov. 17, 2017. 10 pgs.
Bai, et al. "TransFusion: Robust lidar-camera fusion for 3D object detection with transformers." Computer Vision Foundation. Conference on Computer Vision and Pattern Recognition, 2020. 10 pages.
Shi, et al. "PV-RCNN: Point-voxel feature set abstraction for 3D object detection." arXiv:2012.00463v3. Nov. 7, 2022. 19 pages.
Zhu, et al. "ConQueR: query contrast voxel-DETR for 3D object detection." arXiv:2212.07289v1, Dec. 14, 2022. 11 pages.

* cited by examiner

MAP-ANCHORED OBJECT DETECTION

BACKGROUND

An autonomous platform can process data to perceive an environment through which the autonomous platform travels. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

Example implementations of the present disclosure relate to systems and techniques for anchoring object detections to map data. Autonomous vehicles can process sensor data to detect objects in an environment. Autonomous vehicles can also access map data that provides rich information about the environment, such as lane boundary information, elevation maps, etc. A machine-learned object detection model of an autonomous vehicle perception system according to the present disclosure can process sensor data fused with map data to directly determine a position of a detected object in the mapped environment. In this manner, for instance, the perception system can leverage existing knowledge of the environment (e.g., information encoded in the map data) to simplify the detection task.

For example, anchoring detections to map data can simplify the detection task by constraining a solution space for a detection output to be localized around an associated map marker. For instance, map data can provide lane markers that locate lanes in a roadway (e.g., markers along lane centerlines). The lane markers can encode two- or three-dimensional locations of the lane centerlines. The perception system can transform the lane marker locations into a reference frame of the sensor data. For instance, the autonomous vehicle can localize itself within the map data, estimating its own position and orientation within the mapped environment. By extension, using calibration data for sensors onboard the vehicle, the perception system can determine relative orientations of the sensors with respect to the map data. In this manner, the perception system can use an estimated pose of a camera to project the lane marker locations into the camera reference frame to detect objects represented within two-dimensional image data. This projection can immediately provide estimated three-dimensional location values for pixels in the image data because the projected markers carry with them the associations with the rich information of the map data.

The object detection model can generate object detection outputs at the projected lane marker locations by optimizing over a local solution space in the region of the projected point. For instance, the object detection model can regress bounding box dimensions and an offset of the bounding box with respect to the projected lane marker locations. In this manner, for instance, the system can reason over the image context to predict the bounding boxes while anchoring the prediction to a definite point on the map.

By simplifying the detection task in this manner, a perception system can achieve better detection outputs with limited sensor data. For instance, LIDAR returns can become increasingly sparse at longer ranges. In contrast, map data can be stored and retrieved in arbitrary resolution at any range. As such, fusing map data of an environment with sensor data depicting the same environment can create a (comparatively) dense lattice of three-dimensional reference locations that can ground the reasoning of the object detection model, even at long ranges.

Further, the object detection model(s) can be range invariant. For instance, the object detection model(s) can operate without explicit dependence on absolute range. In this manner, for example, the object detection model(s) can be applied on sensor inputs and map projections at a variety of ranges. The object detection model(s) can operate at runtime in a different range domain than was used for training. For instance, an object detection model trained using close-range camera inputs can be deployed at runtime to perform object detection on long-range camera data.

Advantageously, example object detection models according to the present disclosure can learn to implicitly (or explicitly) correct for projection errors. A projection error can arise from, for instance, a miscalibration of the sensors, an error in the estimation of the pose of the vehicle with respect to the map, etc. By jointly processing the fused sensor data and map data, the object detection models can use the full context of the sensor data to refine the detected object locations, even in the presence of projection error. For instance, even when projected lane markers might not align exactly with painted lane markers depicted in the sensor data, the object detection model can (implicitly) learn to recognize the painted lane markers and other contextual cues to adjust the predicted relationship to the projected marker to accommodate the error of the projected marker itself. The perception system can also explicitly obtain an estimate of the projection error to help error-correct future object detection processing cycles.

Advantageously, example object detection models according to the present disclosure can provide improved lane detections even with coarse range estimates. For instance, in some scenarios, accurate lane detections can be more influential on planning decisions than precise range estimates. For example, it can be valuable to determine that a vehicle is stopped on a shoulder of the road, even if the exact range at which the vehicle is located is not yet determined with a high degree of confidence. This can provide for longer range detections with higher certainty, providing the vehicle with more time to plan and execute actions in response to the detected objects.

Using image processing alone at long ranges can involve large levels of range uncertainty. With such levels of uncertainty, it can be challenging for such traditional systems to precisely determine if, for example, an object is positioned on a shoulder of a road or in an active traffic lane. By directly fusing sensor data with long-range map data (that can include lane contour data) example perception systems according to the present disclosure can more readily associate detected objects with a particular lane of the roadway.

The techniques of the present disclosure can provide a number of technical effects and benefits that improve the functioning of the autonomous vehicle and its computing systems and advance the field of autonomous driving as a whole. For instance, a perception system according to the present disclosure can achieve better detection outputs with limited sensor data, increasing the perception range of the vehicle for a given configuration of sensor capabilities. Additionally, a perception system can more efficiently compute object detection outputs. For a given size of a machine-learned object detection model, leveraging geometric priors to fuse the map data and sensor data can free the model parameters of the task of independently predicting three-dimensional locations. This can allow the model parameters' expressivity to focus on the simplified task of optimizing in a local region of a projected map marker. Additionally, autonomous vehicles can increase detection range using cheaper, more robust sensors (e.g., camera sensors as compared to LIDAR sensors) when fused with map data, lowering an overall cost of the vehicle, improving functionality, and ultimately improving the pace of adoption of the emerging technology of autonomous vehicles.

For example, in an aspect, the present disclosure provides an example method for object detection. The example method can include obtaining sensor data descriptive of an environment of an autonomous vehicle. The example method can include obtaining a plurality of travel way markers from map data descriptive of the environment. The example method can include determining, using a machine-learned object detection model and based on the sensor data, an association between one or more travel way markers of the plurality of travel way markers and an object in the environment. The example method can include generating, using the machine-learned object detection model, an offset with respect to the one or more travel way markers of a spatial region of the environment associated with the object.

For example, in an aspect, the present disclosure provides an example autonomous vehicle control system for controlling an autonomous vehicle. In some implementations, the example autonomous vehicle control system includes one or more processors and one or more non-transitory computer-readable media storing instructions that are executable by the one or more processors to cause the computing system to perform operations. The operations can include obtaining sensor data descriptive of an environment of an autonomous vehicle. The operations can include obtaining a plurality of travel way markers from map data descriptive of the environment. The operations can include determining, using a machine-learned object detection model and based on the sensor data, an association between one or more travel way markers of the plurality of travel way markers and an object in the environment. The operations can include generating, using the machine-learned object detection model, an offset with respect to the one or more travel way markers of a spatial region of the environment associated with the object.

For example, in an aspect, the present disclosure provides for one or more example non-transitory computer-readable media storing instructions that are executable to cause one or more processors to perform operations. The operations can include obtaining sensor data descriptive of an environment of an autonomous vehicle. The operations can include obtaining a plurality of travel way markers from map data descriptive of the environment. The operations can include determining, using a machine-learned object detection model and based on the sensor data, an association between one or more travel way markers of the plurality of travel way markers and an object in the environment. The operations can include generating, using the machine-learned object detection model, an offset with respect to the one or more travel way markers of a spatial region of the environment associated with the object.

Other example aspects of the present disclosure are directed to other systems, methods, vehicles, apparatuses, tangible non-transitory computer-readable media, and devices for performing functions described herein. These and other features, aspects and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which.

DETAILED DESCRIPTION

The following describes the technology of this disclosure within the context of an autonomous vehicle for example purposes only. As described herein, the technology described herein is not limited to an autonomous vehicle and can be implemented for or within other autonomous platforms and other computing systems.

Figure 1:
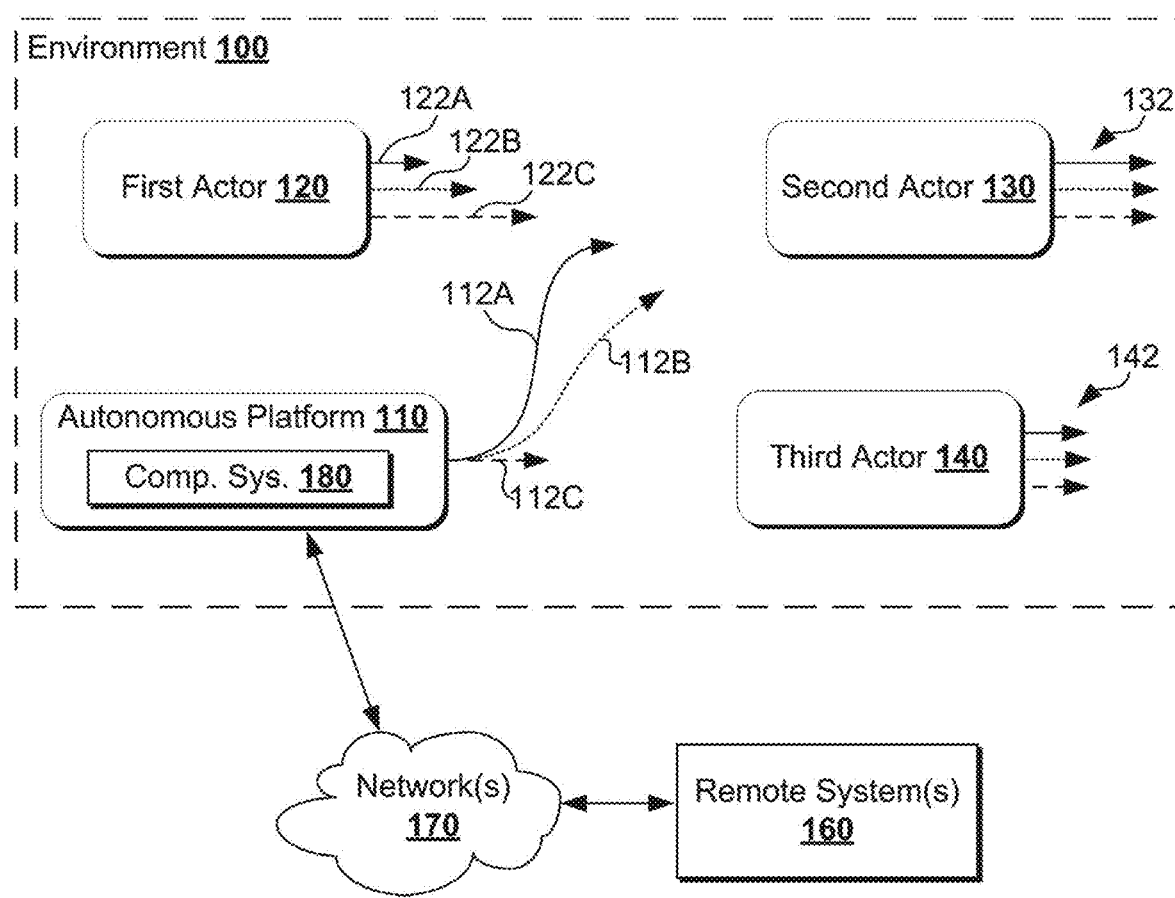
FIG. 1 is a block diagram of an example operational scenario, according to some implementations of the present disclosure.

With reference to FIGS. 1-11, example implementations of the present disclosure are discussed in further detail. FIG. 1 is a block diagram of an example operational scenario, according to some implementations of the present disclosure. In the example operational scenario, an environment 100 contains an autonomous platform 110 and a number of objects, including first actor 120, second actor 130, and third actor 140. In the example operational scenario, the autonomous platform 110 can move through the environment 100 and interact with the object(s) that are located within the environment 100 (e.g., first actor 120, second actor 130, third actor 140, etc.). The autonomous platform 110 can optionally be configured to communicate with remote system(s) 160 through network(s) 170.

The environment 100 may be or include an indoor environment (e.g., within one or more facilities, etc.) or an outdoor environment. An indoor environment, for example, may be an environment enclosed by a structure such as a building (e.g., a service depot, maintenance location, manufacturing facility, etc.). An outdoor environment, for example, may be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

The autonomous platform 110 may be any type of platform configured to operate within the environment 100. For example, the autonomous platform 110 may be a vehicle configured to autonomously perceive and operate within the environment 100. The vehicles may be a ground-based autonomous vehicle such as, for example, an autonomous car, truck, van, etc. The autonomous platform 110 may be an autonomous vehicle that can control, be connected to, or be otherwise associated with implements, attachments, and/or accessories for transporting people or cargo. This can include, for example, an autonomous tractor optionally coupled to a cargo trailer. Additionally, or alternatively, the autonomous platform 110 may be any other type of vehicle such as one or more aerial vehicles, water-based vehicles, space-based vehicles, other ground-based vehicles, etc.

The autonomous platform 110 may be configured to communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicating tasks that the autonomous platform 110 should perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and can include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, environment 100 can include one or more objects. The object(s) may be objects not in motion or not predicted to move ("static objects") or object(s) in motion or predicted to be in motion ("dynamic objects" or "actors"). In some implementations, the environment 100 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc.

As further described herein, the autonomous platform 110 can utilize its autonomy system(s) to detect these actors (and their movement) and plan its motion to navigate through the environment 100 according to one or more platform trajectories 112A-C. The autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system(s).

Figure 2:
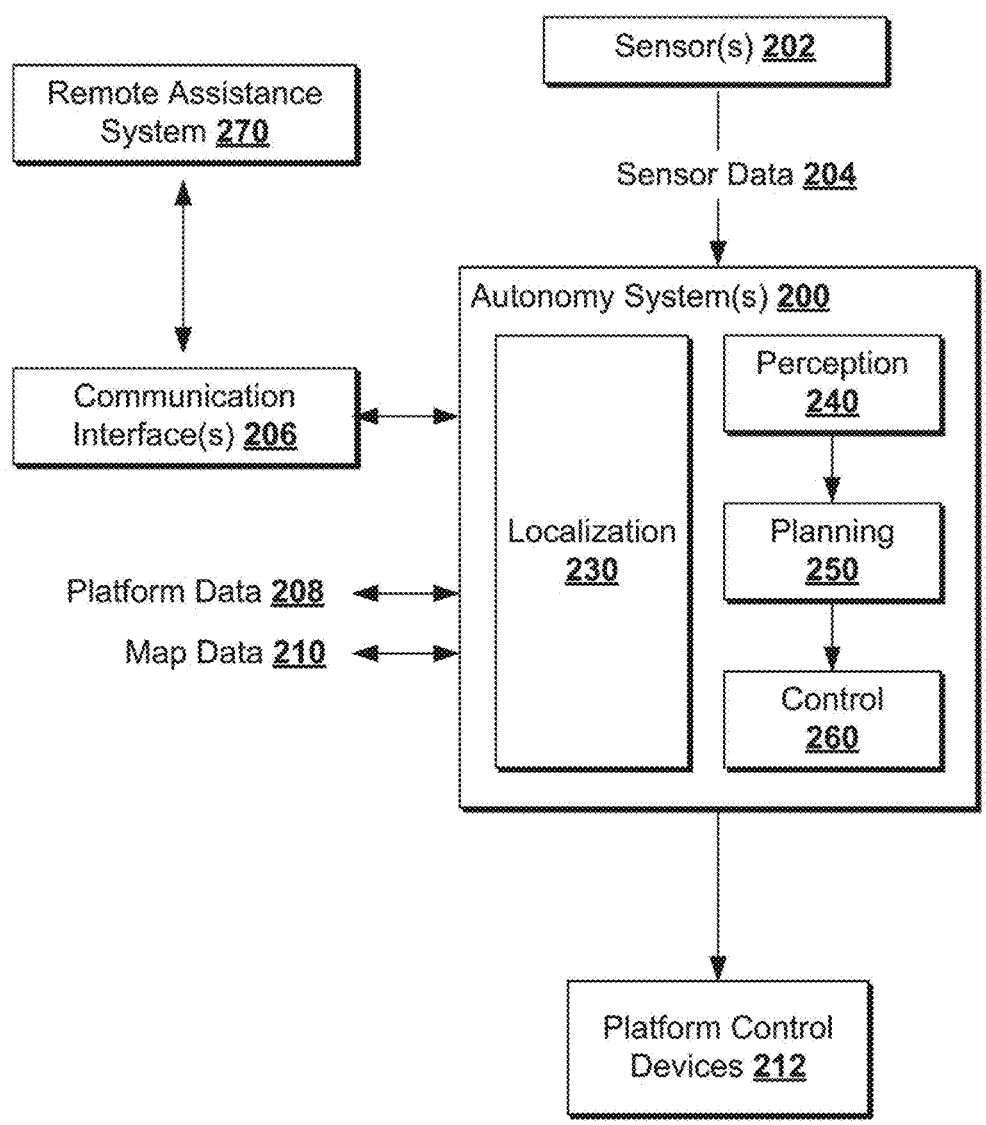
FIG. 2 is a block diagram of an example system, according to some implementations of the present disclosure.

FIG. 2 is a block diagram of an example autonomy system 200 for an autonomous platform, according to some implementations of the present disclosure. In some implementations, the autonomy system 200 can be implemented by a computing system of the autonomous platform (e.g., the onboard computing system(s) 180 of the autonomous platform 110). The autonomy system 200 can operate to obtain inputs from sensor(s) 202 or other input devices. In some implementations, the autonomy system 200 can additionally obtain platform data 208 (e.g., map data 210) from local or remote storage. The autonomy system 200 can generate control outputs for controlling the autonomous platform (e.g., through platform control devices 212, etc.) based on sensor data 204, map data 210, or other data. The autonomy system 200 may include different subsystems for performing various autonomy operations. The subsystems may include a localization system 230, a perception system 240, a planning system 250, and a control system 260. The localization system 230 can determine the location of the autonomous platform within its environment; the perception system 240 can detect, classify, and track objects and actors in the environment; the planning system 250 can determine a trajectory for the autonomous platform; and the control system 260 can translate the trajectory into vehicle controls for controlling the autonomous platform. The autonomy system 200 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the autonomy system 200 can be shared among its subsystems, or a subsystem can have a set of dedicated computing resources.

In some implementations, the autonomy system 200 can be implemented for or by an autonomous vehicle (e.g., a ground-based autonomous vehicle). The autonomy system 200 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing the autonomy system 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a semi-autonomous operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

Autonomy system 200 can be located onboard (e.g., on or within) an autonomous platform and can be configured to operate the autonomous platform in various environments. The environment may be a real-world environment or a simulated environment. In some implementations, one or more simulation computing devices can simulate one or more of: the sensors 202, the sensor data 204, communication interface(s) 206, the platform data 208, or the platform control devices 212 for simulating operation of the autonomy system 200.

In some implementations, the autonomy system 200 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system 200 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system 200 can be supplemented or substituted by a remote system communicating over the communication interface(s) 206. For instance, in some implementations, the map data 210 can be downloaded over a network to a remote system using the communication interface(s) 206. In some examples, one or more of the localization system 230, the perception system 240, the planning system 250, or the control system 260 can be updated, influenced, nudged, communicated with, etc. by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). Additionally, or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicating or otherwise being associated with at least a portion of the environment of the autonomous platform. The sensor data 204 can include image data (e.g., 2D camera data, video data, etc.), RADAR data, LIDAR data (e.g., 3D point cloud data, etc.), audio data, or other types of data. In some implementations, the autonomy system 200 can obtain input from additional types of sensors, such as inertial measurement units (IMUs), altimeters, inclinometers, odometry devices, location or positioning devices (e.g., GPS, compass), wheel encoders, or other types of sensors. In some implementations, the autonomy system 200 can obtain sensor data 204 associated with particular component(s) or system(s) of an autonomous platform. This sensor data 204 can indicate, for example, wheel speed, component temperatures, steering angle, cargo or passenger status, etc. In some implementations, the autonomy system 200 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can indicate static object(s) or actor(s) within an environment of the autonomous platform. The multi-modal sensor data can include at least two types of sensor data (e.g., camera and LIDAR data). In some implementations, the autonomous platform can utilize the sensor data 204 for sensors that are remote from (e.g., offboard) the autonomous platform. This can include for example, sensor data 204 captured by a different autonomous platform.

The autonomy system 200 can obtain the map data 210 associated with an environment in which the autonomous platform was, is, or will be located. The map data 210 can provide information about an environment or a geographic area. For example, the map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform in understanding its surrounding environment and its relationship thereto. In some implementations, the map data 210 can include high-definition map information. Additionally, or alternatively, the map data 210 can include sparse map data (e.g., lane graphs, etc.). In some implementations, the sensor data 204 can be fused with or used to update the map data 210 in real-time.

The autonomy system 200 can include the localization system 230, which can provide an autonomous platform with an understanding of its location and orientation in an environment. In some examples, the localization system 230 can support one or more other subsystems of the autonomy system 200, such as by providing a unified local reference frame for performing, e.g., perception operations, planning operations, or control operations.

In some implementations, the localization system 230 can determine a current position of the autonomous platform. A current position can include a global position (e.g., respecting a georeferenced anchor, etc.) or relative position (e.g., respecting objects in the environment, etc.). The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system 200 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the autonomous platform's position within that environment. Accordingly, in some implementations, the autonomous platform can identify its position within the surrounding environment (e.g., across six axes, etc.) based on a search over the map data 210. In some implementations, given an initial location, the localization system 230 can update the autonomous platform's location with incremental re-alignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system 200 based on a position obtained by the localization system 230 (e.g., a number of tiles selected in the vicinity of the position).

In some implementations, the localization system 230 can determine positions (e.g., relative, or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform, and the localization system 230 can provide for data describing the position (e.g., absolute, relative, etc.) of the autonomous platform as well as the cargo platform. Such information can be obtained by the other autonomy systems to help operate the autonomous platform.

The autonomy system 200 can include the perception system 240, which can allow an autonomous platform to detect, classify, and track objects and actors in its environment. Environmental features or objects perceived within an environment can be those within the field of view of the sensor(s) 202 or predicted to be occluded from the sensor(s) 202. This can include object(s) not in motion or not predicted to move (static objects) or object(s) in motion or predicted to be in motion (dynamic objects/actors).

The perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 240 can determine the state(s) using one or more algorithms or machine-learned models configured to identify/classify objects based on inputs from the sensor(s) 202. The perception system can use different modalities of the sensor data 204 to generate a representation of the environment to be processed by the one or more algorithms or machine-learned models. In some implementations, state(s) for one or more identified or unidentified objects can be maintained and updated over time as the autonomous platform continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment.

The autonomy system 200 can include the planning system 250, which can be configured to determine how the autonomous platform is to interact with and move within its environment. The planning system 250 can determine one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of the planning system 250. A motion trajectory can be defined by one or more waypoints (with associated coordinates). The waypoint(s) can be future location(s) for the autonomous platform. The motion plans can be continuously generated, updated, and considered by the planning system 250.

The motion planning system 250 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 250 can determine a desired trajectory for executing a strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 250 can utilize static cost(s) to evaluate trajectories for the autonomous platform (e.g., "avoid lane boundaries," "minimize jerk," etc.). Additionally, or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories based on one or more static costs, one or more dynamic costs, or a combination thereof. The planning system 250 can select a motion plan (and a corresponding trajectory) based on a ranking of a plurality of candidate trajectories. In some implementations, the planning system 250 can select a highest ranked candidate, or a highest ranked feasible candidate.

The planning system 250 can then validate the selected trajectory against one or more constraints before the trajectory is executed by the autonomous platform.

To help with its motion planning decisions, the planning system 250 can be configured to perform a forecasting function. The planning system 250 can forecast future state(s) of the environment. This can include forecasting the future state(s) of other actors in the environment. In some implementations, the planning system 250 can forecast future state(s) based on current or past state(s) (e.g., as developed or maintained by the perception system 240). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous platform. Additionally, or alternatively, the probabilities can include probabilities conditioned on trajectory options available to one or more other actors.

In some implementations, the planning system 250 can perform interactive forecasting. The planning system 250 can determine a motion plan for an autonomous platform with an understanding of how forecasted future states of the environment can be affected by execution of one or more candidate motion plans. By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). For instance, the autonomous platform 110 (e.g., using its autonomy system 200) can forecast that a platform trajectory 112A to more quickly move the autonomous platform 110 into the area in front of the first actor 120 is likely associated with the first actor 120 decreasing forward speed and yielding more quickly to the autonomous platform 110 in accordance with first actor trajectory 122A. Additionally or alternatively, the autonomous platform 110 can forecast that a platform trajectory 112B to gently move the autonomous platform 110 into the area in front of the first actor 120 is likely associated with the first actor 120 slightly decreasing speed and yielding slowly to the autonomous platform 110 in accordance with first actor trajectory 122B. Additionally or alternatively, the autonomous platform 110 can forecast that a platform trajectory 112C to remain in a parallel alignment with the first actor 120 is likely associated with the first actor 120 not yielding any distance to the autonomous platform 110 in accordance with first actor trajectory 122C. Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 100. In this manner, for example, the autonomous platform 110 can interleave its forecasting and motion planning functionality.

To implement selected motion plan(s), the autonomy system 200 can include a control system 260 (e.g., a vehicle control system). Generally, the control system 260 can provide an interface between the autonomy system 200 and the platform control devices 212 for implementing the strategies and motion plan(s) generated by the planning system 250. For instance, control system 260 can implement the selected motion plan/trajectory to control the autonomous platform's motion through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle) by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system 200 (or vice versa) through the communication channel(s).

The autonomy system 200 can receive, through communication interface(s) 206, assistive signal(s) from remote assistance system 270. Remote assistance system 270 can communicate with the autonomy system 200 over a network (e.g., as a remote system 160 over network 170). In some implementations, the autonomy system 200 can initiate a communication session with the remote assistance system 270. For example, the autonomy system 200 can initiate a session based on or in response to a trigger. In some implementations, the trigger may be an alert, an error signal, a map feature, a request, a location, a traffic condition, a road condition, etc.

After initiating the session, the autonomy system 200 can provide context data to the remote assistance system 270. The context data may include sensor data 204 and state data of the autonomous platform. For example, the context data may include a live camera feed from a camera of the autonomous platform and the autonomous platform's current speed. An operator (e.g., human operator) of the remote assistance system 270 can use the context data to select assistive signals. The assistive signal(s) can provide values or adjustments for various operational parameters or characteristics for the autonomy system 200. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the autonomy system 200.

Autonomy system 200 can use the assistive signal(s) for input into one or more autonomy subsystems for performing autonomy functions. For instance, the planning subsystem 250 can receive the assistive signal(s) as an input for generating a motion plan. For example, assistive signal(s) can include constraints for generating a motion plan. Additionally, or alternatively, assistive signal(s) can include cost or reward adjustments for influencing motion planning by the planning subsystem 250. Additionally, or alternatively, assistive signal(s) can be considered by the autonomy system 200 as suggestive inputs for consideration in addition to other received data (e.g., sensor inputs, etc.).

The autonomy system 200 may be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
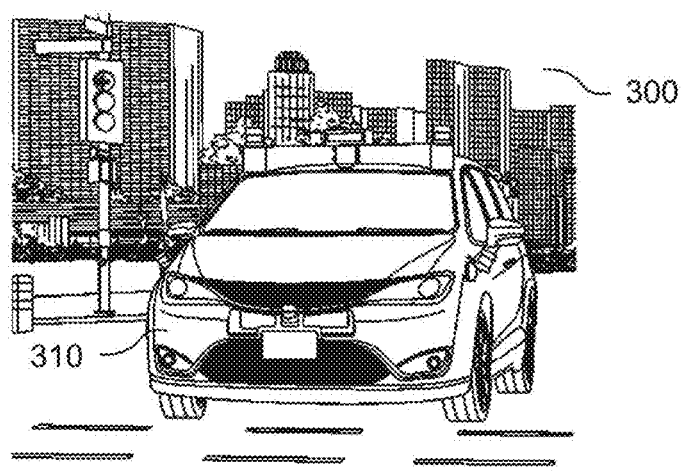
FIG. 3A is a representation of an example operational environment, according to some implementations of the present disclosure.

For example, with reference to FIG. 3A, an operational environment can include a dense environment 300. An autonomous platform can include an autonomous vehicle 310 controlled by the autonomy system 200. In some implementations, the autonomous vehicle 310 can be configured for maneuverability in a dense environment, such as with a configured wheelbase or other specifications. In some implementations, the autonomous vehicle 310 can be configured for transporting cargo or passengers. In some implementations, the autonomous vehicle 310 can be configured to transport numerous passengers (e.g., a passenger van, a shuttle, a bus, etc.). In some implementations, the autonomous vehicle 310 can be configured to transport cargo, such as large quantities of cargo (e.g., a truck, a box van, a step van, etc.) or smaller cargo (e.g., food, personal packages, etc.).

Figure 3B:
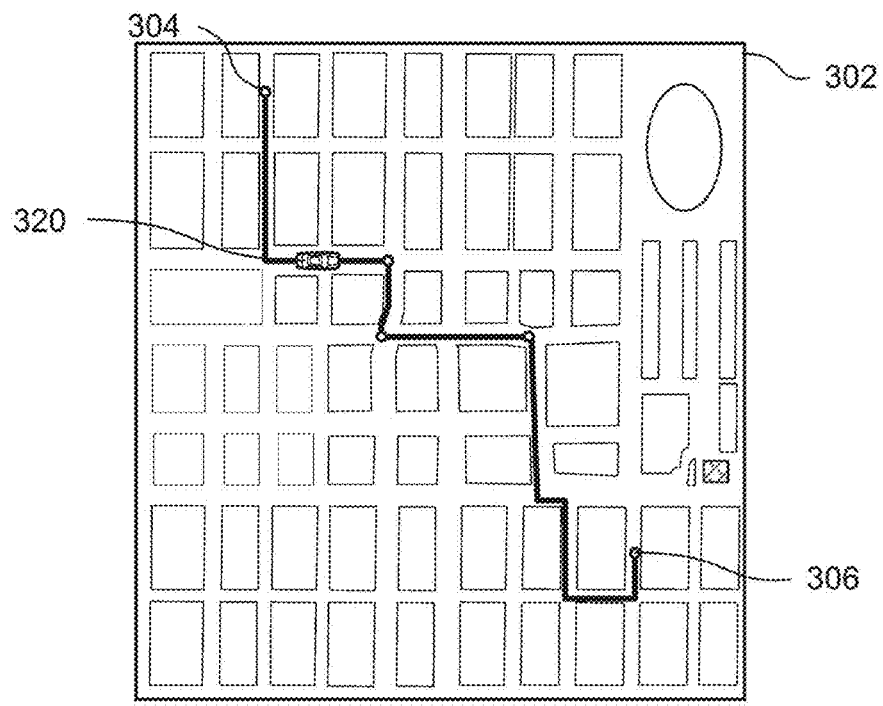
FIG. 3B is a representation of an example map of an operational environment, according to some implementations of the present disclosure.

With reference to FIG. 3B, a selected overhead view 302 of the dense environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 310. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

Figure 3C:
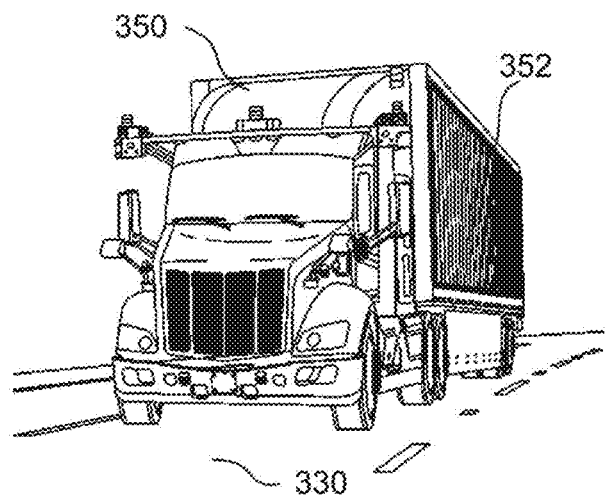
FIG. 3C is a representation of an example operational environment, according to some implementations of the present disclosure.

With reference to FIG. 3C, in another example, an operational environment can include an open travel way environment 330. An autonomous platform can include an autonomous vehicle 350 controlled by the autonomy system 200. This can include an autonomous tractor for an autonomous truck. In some implementations, the autonomous vehicle 350 can be configured for high payload transport (e.g., transporting freight or other cargo or passengers in quantity), such as for long distance, high payload transport. For instance, the autonomous vehicle 350 can include one or more cargo platform attachments such as a trailer 352. Although depicted as a towed attachment in FIG. 3C, in some implementations one or more cargo platforms can be integrated into (e.g., attached to the chassis of, etc.) the autonomous vehicle 350 (e.g., as in a box van, step van, etc.).

Figure 3D:
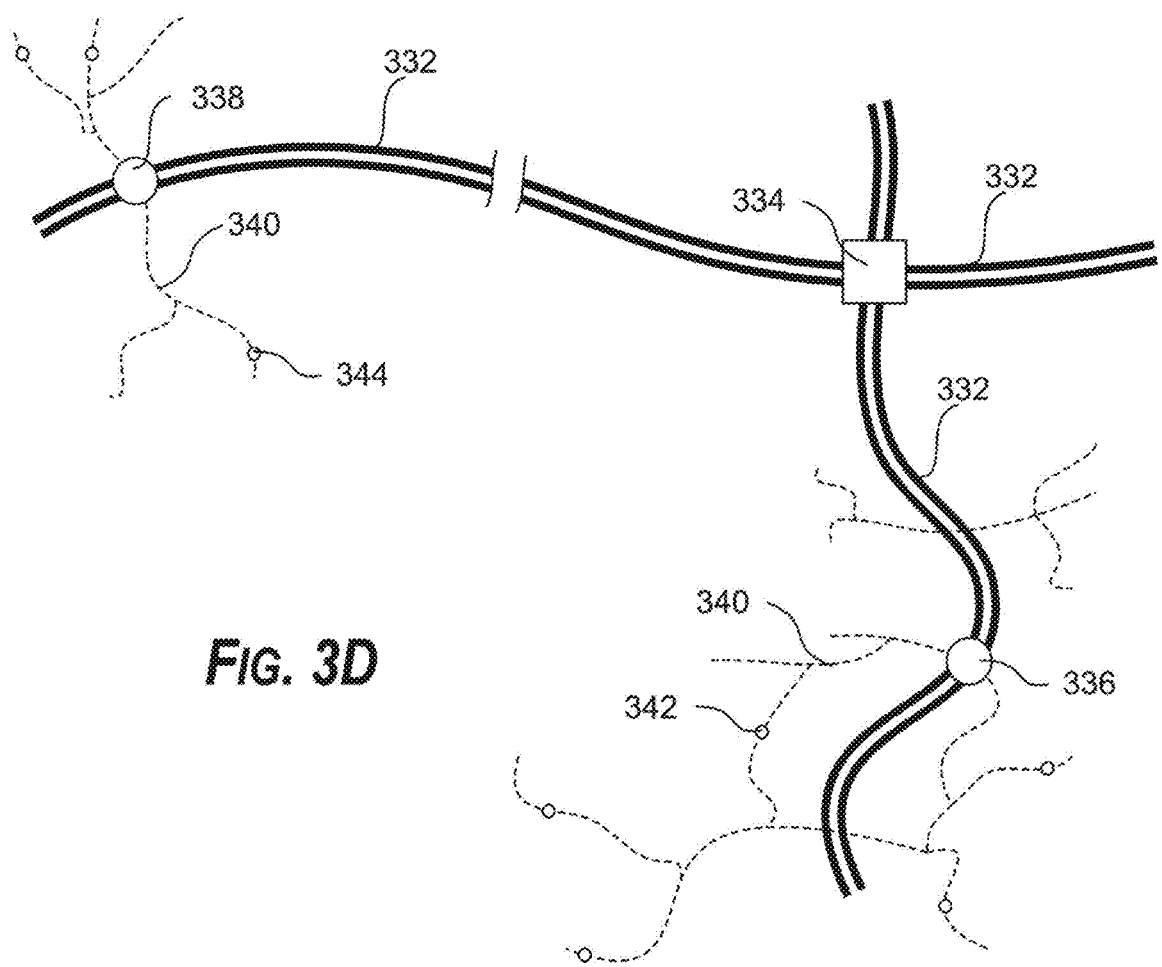
FIG. 3D is a representation of an example map of an operational environment, according to some implementations of the present disclosure.

With reference to FIG. 3D, a selected overhead view of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to transfer hub 336 (e.g., by a human-driven vehicle, by the autonomous vehicle 310, etc.) for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 350) for transport to one or more other transfer hubs, such as the transfer hub 338. For instance, although not depicted, it is to be understood that the open travel way environment 330 can include more transfer hubs than the transfer hubs 336 and 338 and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

To improve the performance of an autonomous platform, such as an autonomous vehicle controlled at least in part using autonomy system 200 (e.g., the autonomous vehicles 310 or 350), the perception system 240 can implement detection techniques according to example aspects of the present disclosure.

Figure 4:
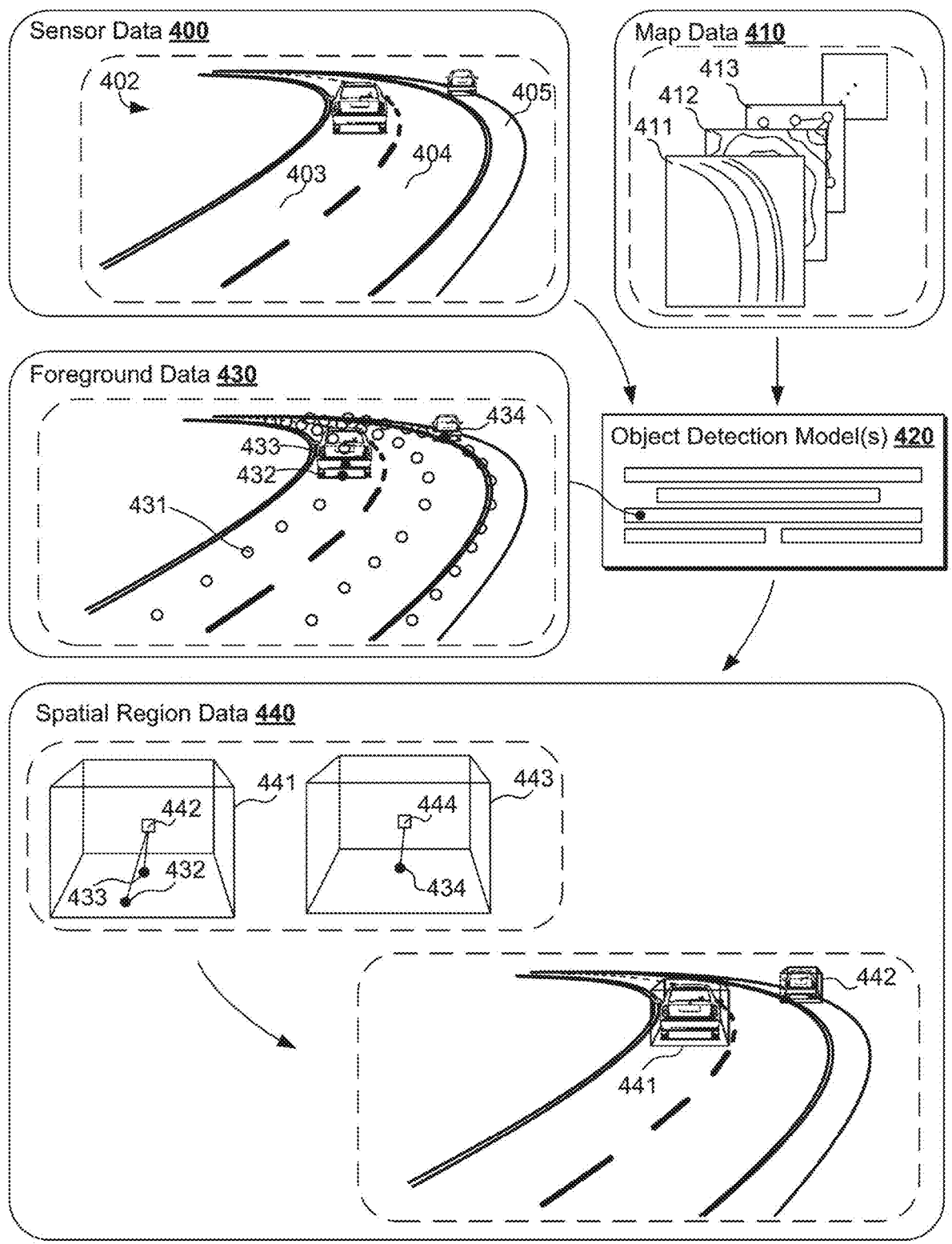
FIG. 4 is a block diagram of an example system for object detection, according to some implementations of the present disclosure.

FIG. 4 is a block diagram of an example detection dataflow. Perception system 240 can access sensor data 400. Sensor data 400 can describe an environment 402. Environment 402 can contain a roadway having lanes 403 and 404 and a shoulder area 405. Perception system 240 can access map data 410. Map data 410 can include multiple layers or datatypes, such as a bird's-eye-view lane boundary layer 411, a topographical layer 412, a graph layer 413, or other layers. Map data 410 can include, in at least one layer, high-definition two- or three-dimensional geometric representations of at least a portion of environment 402. Perception system 240 can implement object detection model(s) 420 to detect one or more objects in environment 402. Object detection model(s) 420 can generate an association between one or more portions of sensor data 400 or map data 410, and object(s) in the environment. Foreground data 430 can indicate the association between one or more portions of sensor data 400 or map data 410, and object(s) in the environment.

For instance, sensor data 400 can include an image of environment 402. A plurality of travel way markers can be projected into the image (e.g., based on a known calibration between the corresponding image sensor(s) and a localization of the autonomous vehicle in the mapped environment 402). Foreground data 430 for one or more portions of the image data can indicate which of the projected travel way markers are associated with portions of the image data that represent an object. For instance, foreground data 430 can indicate that travel way marker 431 (unfilled circle) is not associated with an object. Foreground data 430 can indicate that travel way markers 432 and 433 (filled circles) are associated with an object. Foreground data 430 can indicate that travel way marker 434 (filled circle) is associated with an object.

Object detection model(s) 420 can generate spatial region data 440 based on foreground data 430. For instance, object detection model(s) 420 can generate bounding boxes or other detection indicators anchored to the travel way markers associated with objects. For instance, object detection model(s) 420 can determine that markers 432 and 433 are associated with the same object(s) and generate a bounding box 441 having a centroid 442. Object detection model(s) 420 can determine that marker 434 is associated with an object(s) and generate a bounding box 443 having a centroid 444. For instance, object detection model(s) 420 can regress an offset of the bounding box(es) with respect to the projected markers.

In this manner, for instance, perception system 240 can anchor the bounding box(es) to map data, thereby directly associating the object detection with the rich descriptive content in the map data. For instance, detected object can directly register with lanes of a travel way (e.g., a position in an active driving lane or a shoulder area). Such perception data can be used to quickly determine high-level information about the environment. For instance, perception system 240 can determine a velocity for a distant object and that an object is located in a particular lane. For instance, perception system 240 can identify a lane in which the object is located. Additionally or alternatively, perception system 240 can determine that a vehicle is a static vehicle (e.g., having a velocity below a threshold). It can be useful to determine at distance which lane the vehicle is in, even if more granular information may not yet be available. For instance, perception system 240 can determine whether the static vehicle is in a shoulder lane of a roadway or in an active traffic lane, enabling the autonomous vehicle to plan accordingly. By determining this information at long range, the autonomous vehicle can have additional time to plan and execute appropriate actions.

Sensor data 400 can include sensor data 204 from sensors 202. Sensor data 400 can include multiple sensor modalities. Sensor data 400 can include imaging data (e.g., from image sensor(s), such as a camera). Sensor data 400 can include ranging data (e.g., LIDAR data, RADAR data, stereoscopic camera data, etc.).

Different image sensor configurations can capture sensor data 400. Imaging devices with varying fields of view can contribute data to sensor data 400. Sensor data 400 can include data from a long-range camera (e.g., a camera with a telephoto focal length lens, a camera with sufficient resolution to resolve long-distance detail even with a wider field of view). Sensor data 400 can include data from a close-range camera (e.g., a camera with a wide-angle focal length lens, a lower resolution camera that resolves sparse detail at long ranges). Sensor data 400 can include fused sensor data. Sensor data 400 can include upsampled image data. For instance, details in image data can be recovered using machine-learned image processing models to denoise, deblur, sharpen, upsample resolution, etc. In this manner, for instance, an effective perception range of an imaging device can be extended.

Sensor data 400 can include long-range perception data. Long-range perception data can include data describing environment 402 beyond a range of a ranging sensor. For instance, long-range perception data can include data describing a portion of environment 402 beyond a detection range of a LIDAR unit, RADAR unit, stereo. A detection range of a LIDAR or RADAR unit can be, for instance, a range beyond which a confidence level or uncertainty metric passes a threshold.

Map data 410 can include data descriptive of environment 402. Map data 410 can be registered to sensor data 400 by localization system 230. Localization system 230 can process sensor data 400 or sensor data 204 to determine a position and orientation of the autonomous vehicle within environment 402 to determine spatial relationships between the vehicle and the map-based representations of environment 402 in map data 410.

For instance, map data 410 can include data representing one or more lanes of a roadway. Map data 410 can represent lanes of the roadway using, for instance, vector-based curve representations (e.g., with or without waypoints, containing line segments, splines, etc.). Markers can be obtained by sampling a continuous representation of the roadway contour to obtain marker data at a desired resolution. For instance, map layer 411 can include travel way data. The travel way data can include data indicating a path of a travel way. The travel way data can include boundaries of lanes, centerlines of lanes, or any other representation of a path of a lane. The travel way data can include a continuous representation of the travel way contour that can be sampled at arbitrary resolution.

Although various example implementations are described herein with respect to map data 410, it is to be understood that other three-dimensional data can be used in a similar manner (e.g., in addition to or in lieu of map data). For instance, LIDAR data can be used along with map data 410 to fuse with image data as described herein. For instance, LIDAR data can be passed to object detection model(s) 420 in another input channel. It is also to be understood that various techniques can be used in combination at different range scales. For instance, within LIDAR range, LIDAR-based sensor fusion detections can be afforded greater weight. Outside of LIDAR range, map-based sensor fusion detections can be afforded greater weight. The transition therebetween can be a smooth transition of detection weightings to facilitate handoff from one dominant modality to another.

Sensor data 400 can also depict the travel ways described in the travel way data of map data 410. Localizing the vehicle within map data 410 can establish a relationship between map data 410 and sensor data 400 that enables registration of the depiction of the travel ways in sensor data 400 with the travel way data of map data 410. For instance, the relationship can include the kinematic relationship between one or more sensors and the vehicle, a heading of the vehicle within the mapped environment and a field of view or orientation of the sensor with respect to the vehicle, etc. The relationship can be based on calibration data that can be updated and refined over time to account for shifts in alignment.

For example, a plurality of travel way markers can be projected onto at least a portion of sensor data 400. For instance, the travel way data can be projected into a camera coordinate system of a camera capturing imagery of the travel way(s). The projection can be based on a camera transformation or projection matrix. For instance, a camera sensor can be calibrated and fixed to the vehicle. A projection of $P_v=(x_v, y_v, z_v)^T$ point in the vehicle frame can be defined by the projection matrix $C=K[R_v|t_v]$, where K is the camera calibration matrix and $R_v$, $t_v$ is the rotation and translation from vehicle to the camera coordinate system. Once the vehicle frame and the map frame are aligned via localization, points in the map frame can be projected into the camera coordinate system.

Figure 5:
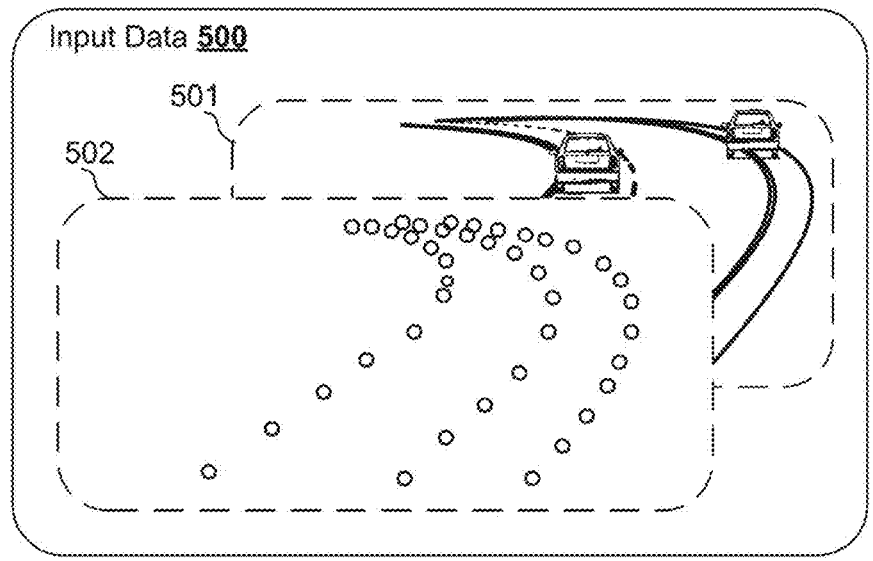
FIG. 5 is a block diagram of an example input, according to some implementations of the present disclosure.

For instance, FIG. 5 depicts a set of input data 500 that contains an image 501 and a lane marker projection 502. Lane marker projection 502 can contain travel way markers that have been projected into a camera space associated with image 501. In this manner, for instance, pixels of image 501 can be associated with travel way markers. Lane marker projection 502 can be stored in an input channel associated with image 501.

In a similar manner, other map data can be projected into a coordinate frame associated with the sensor(s). For instance, map data 410 can include a high-definition ground mapping (e.g., a topographic layer 412). The projected markers can include points indicating a ground surface.

With reference again to FIG. 4, object detection model(s) 420 can process sensor data 400 and map data 410 to generate spatial region data 440. Object detection model(s) 420 can include one or more machine-learned models. Object detection model(s) 420 can include model(s) configured to process sensor data (single modal sensor data, multi modal sensor data, fused sensor data, aggregate sensor data, etc.). Object detection model(s) 420 can include neural networks, such as deep neural networks. Object detection model(s) 420 can use mechanisms of attention (e.g., self-attention, such as in transformer model architectures). Object detection model(s) 420 can include convolutional layers configured to generate spatial feature maps based on an input. For instance, an example object detection model can include a ResNet architecture.

Object detection model(s) 420 can obtain foreground data 430 to guide generation of spatial region data 440. For instance, foreground data 430 can include data indicating the likelihood of a presence of an object at a particular location. Foreground data 430 can include a binary flag that indicates whether an object is present at a particular location. Foreground data 430 can include a multichannel data structure indicating, in each channel, the presence of an object associated with a class for that channel. For instance, a channel of a data structure can be associated with a vehicle class. A data value in that layer can indicate the presence of a vehicle at a location associated with an indexed position of the data value (e.g., corresponding to a pixel indexed in the same location on a different layer). Other classes can correspond to other layers.

Foreground data 430 can indicate a likelihood of a presence of an object in a portion of an image associated with the projected map data 410. For instance, foreground data 430 can contain, in a region associated with projected marker 431 (e.g., one or more pixels falling under the projected marker), an indication of a low likelihood of a foreground object. Foreground data 430 can contain, in a region associated with projected marker 432, 433, or 434 (e.g., one or more pixels falling under the projected marker), an indication of a higher likelihood of a foreground object (e.g., a value of 1, or a value that ceils, rounds, or otherwise snaps to a designated value, etc.).

Foreground data 430 can thus provide an indication of an association between one or more travel way markers and an object in the environment (e.g., vehicle in the foreground). Various metrics can be used for determining an association between one or more travel way markers of the plurality of travel way markers and an object in the environment. Example metrics include a distance metric, such as a radius defining an area surrounding a marker within which tracked objects are to be associated with that marker. Example distance metrics can be range-adaptive, such that the metrics become relaxed at longer distances to improve recall of the detection model(s).

Foreground data 430 can act as a mask on or filter applied to other model layer(s) to cause object detection model(s) 420 to generate spatial region data 440 based around foreground markers in foreground data 430. For instance, one or more components of object detection model(s) 420 can "fire" on or sparsely process the active foreground points to cause object detection model(s) 420 to regress spatial region data 440 with respect to those active foreground points.

Spatial region data 440 can contain bounding regions regressed from the foreground markers. Spatial region data 440 can be regressed in the sensor coordinate space (e.g., in the image frame) with respect to the foreground marker(s). In this manner, for instance, the rich context information in map data 410 can be directly indexed with the foreground marker(s) and the corresponding spatial region data 440.

For example, a location of a centroid 442 of a bounding box 441 can be positioned a distance away from markers 432/433. Object detection model(s) 420 can regress the distances or offsets between centroid 442 and markers 432,

433. Object detection model(s) 420 can process the image data in view of the foreground marker(s) to output the offsets.

Figure 6:
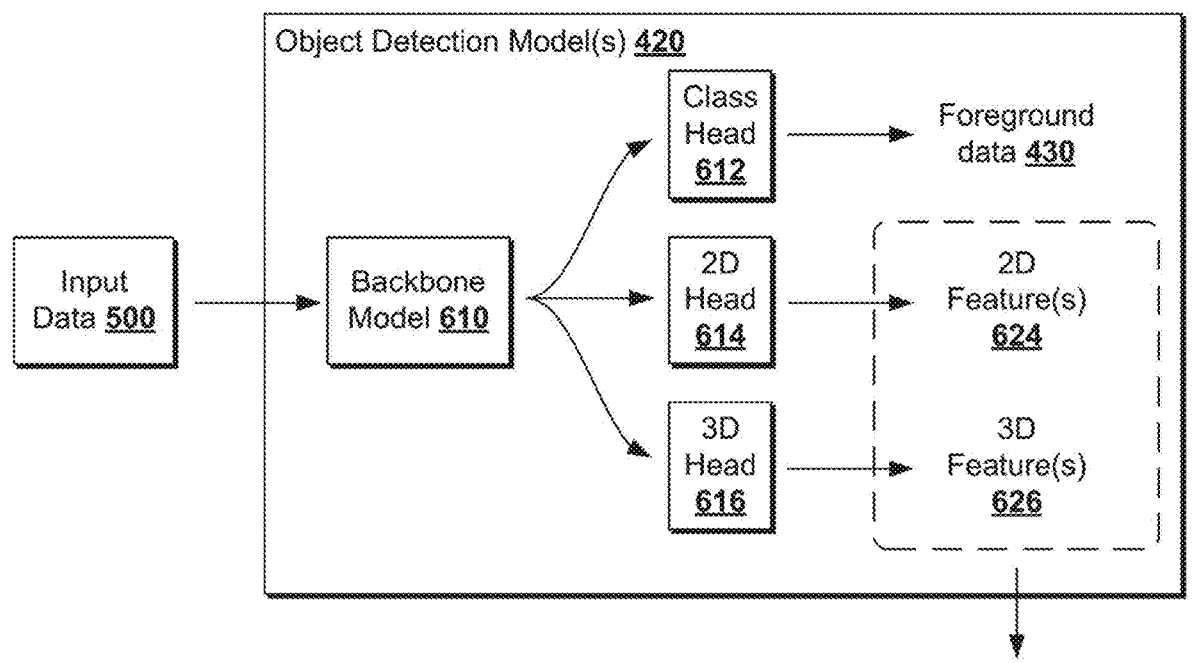
FIG. 6 is a block diagram of an example system for object detection, according to some implementations of the present disclosure.

FIG. 6 illustrates an example architecture of one or more of object detection model(s) 420. A backbone model 610 can process input data 500. For instance, the backbone model 610 can process the sensor data (e.g., image data) and map data (e.g., projected map markers) together. In this manner, for instance, backbone model 610 can generate feature maps that encode fused information across the channels of the inputs. Backbone model 610 can reason over the entire input image and the entire set of projected markers. Backbone model 610 can implicitly associate the projected markers with recognizable features of the input image.

Output(s) of backbone model 610 can be passed to task-specific output heads, such as a class head 612, a two-dimensional head 614, and a three-dimensional head 616. A class head 612 can process feature maps generated by backbone model 610 to determine foreground data. For instance, class head 612 can be configured to determine the presence of objects in one or more classes (e.g., vehicles, pedestrians, etc.). This objectness data can be masked with the projected map data 410 to obtain foreground data 430 that indicates one or more foreground markers.

A two-dimensional head 614 can process feature maps generated by backbone model 610 to generate two-dimensional bounding features 624 that can be used to obtain a bounding box in the sensor coordinate frame. A three-dimensional head 616 can process feature maps generated by backbone model 610 to generate three-dimensional bounding features 626 that can be used to obtain a three-dimensional bounding box.

Any one or more of, or all of, the task specific output heads can include machine-learned model components. Any one or more of, or all of, the task specific output heads can include neural networks. The task specific output heads can process feature maps from various portions of the backbone model 610. For instance, backbone model 610 can include layers at various resolutions and depths. The task specific heads can process one or more layers from one or more different resolutions and depths.

With reference again to FIG. 4, object detection model(s) 420 can perform a refinement technique to obtain high quality spatial region data 440. For instance, object detection model(s) 420 can implement non-maximum suppression on predicted spatial region data to determine likely bounding boxes.

An example output decoding procedure can include sampling a classification heatmap where the travel way markers are projected (e.g., to obtain foreground data 430). For the markers indicated as foreground, a 2D detection head 614 can decode 2D targets to obtain 2D bounding boxes in the image frame. For example, a 2D detection head 614 can receive as input feature maps from backbone model 610 and foreground data 430. Based on those inputs, 2D detection head 614 can regress 2D spatial region data with respect to the foreground markers. A round of non-maximal suppression can be applied to the two-dimensional regressed spatial region data. A 3D detection head 616 can receive as input feature maps from backbone model 610 and foreground data 430. Based on those inputs, 3D detection head 616 can regress 3D spatial region data with respect to the foreground markers. A round of non-maximal suppression can be applied to the three-dimensional regressed spatial region data.

One benefit of the techniques described herein is that the object detection model(s) 420 can have access to all the sensor context around the projected point throughout the regression process while the resulting bounding box is directly anchored to and within a high-definition map data. This can provide for learned pose correction. For instance, object detection model(s) 420 can regress the offset from the map marker to the spatial region data 440. In some scenarios, if the projected map data markers contain projection error, the offsets might be skewed (e.g., larger than they should be). For instance, if a projected lane centerline is misaligned with the centerline of the lane in the image, vehicles in the imaged lane might be detected in the imaged location such that the predicted offset includes the distance from the centroid to the lane marker plus the distance of the misalignment.

Figure 7:
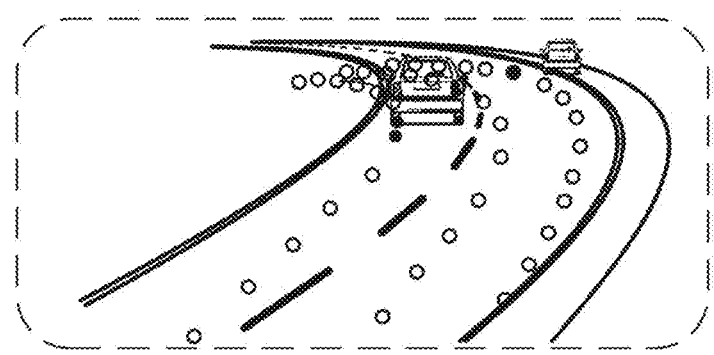
FIG. 7 is a block diagram of an example misaligned projection, according to some implementations of the present disclosure.

Advantageously, object detection model(s) 420 can automatically compensate for the misalignment. FIG. 7 illustrates an example misalignment of the projected travel way markers and the imaged lanes. Because the spatial region data can be regressed in view of the sensor data 400, the detected boundary can be correctly identified in the sensor data 400 despite possible misalignment. Further, notwithstanding potential misalignment, the registration between the sensor data 400 and the map data 410 can continue to provide improved, coarse-grained detection information at long ranges. For instance, object detection model(s) 420 can learn to register a detection with the correct lane of the roadway even when the projected lane markers are misaligned.

Perception system 240 can explicitly regress a value characterizing the misalignment. For instance, a component of object detection model(s) 420 can learn to regress a translation or rotation error or other projection error in the map data projection. This error can inform future perception system 240 iterations to recalibrate detections. For instance, perception system 240 can estimate and correct projection errors in real time.

For instance, the relative pose between the sensor coordinate frame and the map coordinate frame can be adjusted to decrease offset values. For instance, taking a median (or mean or other statistical measure) over offsets in a given set of detections in a scene can provide a goodness metric for the projection quality. The projection error can be decreased by adjusting the relative pose (e.g., the projection transform, such as the camera matrix) to decrease the statistical measure of the offsets.

Perception system 240 can perform projection error estimation using a dedicated output head. Perception system 240 can perform projection error estimation using a separate neural network trained to regress the projection error based on the outputs of object detection model(s) 420.

Perception system 240 can also predict projection error using other input signals. Examples of other input signals can include sensor data indicating states of one or more vehicle components. For example, by processing sensor data indicating suspension movement, perception system 240 can determine that projection error can correlate to suspension movement. For example, in certain situations, sensor pose calibration can suffer under extreme vibration or inertial loads due to flexibility in the sensor mounting configuration. In this manner, for example, other input signals can be used by perception system 240 to predict a projection error value. This predicted projection error value can be used to tune the calibration of the projection transform for projecting map data 410 into a sensor coordinate system.

Figure 8:
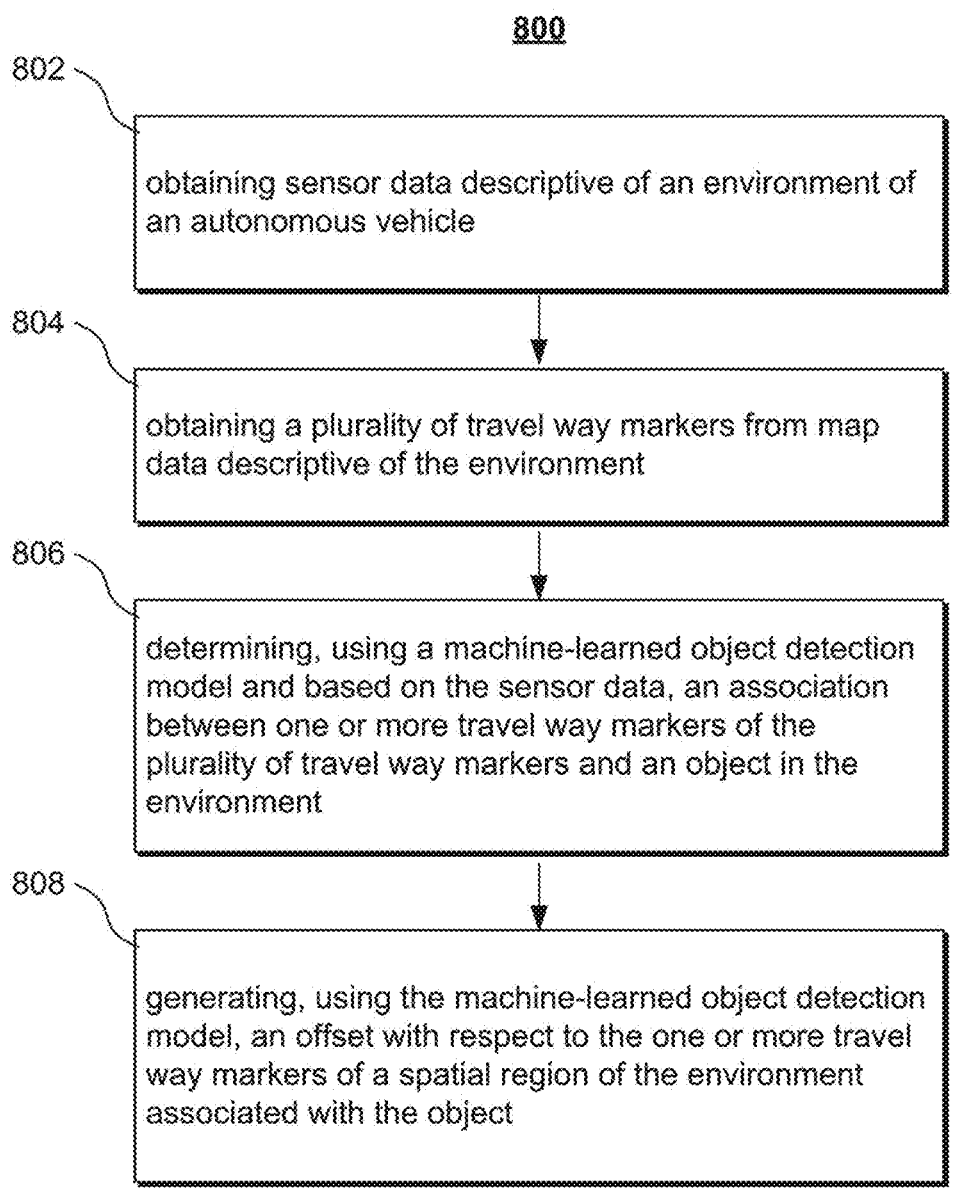
FIG. 8 is a flowchart of an example method for object detection, according to some implementations of the present disclosure.

FIG. 8 is a flowchart of method 800 for performing object detection according to aspects of the present disclosure. One or more portion(s) of the method 800 can be implemented by a computing system that includes one or more computing devices such as, for example, the computing systems described with reference to the other figures (e.g., autonomous platform 110, vehicle computing system 180, remote system(s) 160, a system of FIG. 11, etc.). Each respective portion of the method 800 can be performed by any (or any combination) of one or more computing devices. Moreover, one or more portion(s) of method 800 can be implemented on the hardware components of the device(s) described herein (e.g., as in FIGS. 1, 2, 11, etc.).

FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 802, example method 800 can include obtaining sensor data descriptive of an environment of an autonomous vehicle. For instance, sensor data can include sensor data 204, sensor data 400, etc.

At 804, example method 800 can include obtaining a plurality of travel way markers from map data descriptive of the environment. For instance, the travel way markers can include lane markers (e.g., centerline markers, lane boundary markers, etc.). In some implementations, example method 800 can include at 804 sampling discrete travel way markers from continuous travel way map data (e.g., vector-based map data formats).

At 806, example method 800 can include determining, using a machine-learned object detection model and based on the sensor data, an association between one or more travel way markers of the plurality of travel way markers and an object in the environment. In some implementations, example method 800 at 806 can include inputting the travel way markers and the sensor data to the machine-learned object detection model and obtaining object data from the machine-learned object detection model at projected locations of the travel way markers in a reference frame of the sensor data. For instance, the object data can indicate that the object is likely to be present at a projected location of the one or more travel way markers. For instance, the object data can include foreground data 430 (e.g., objectness data).

In some implementations, example method 800 at 806 can include subsampling, based on the travel way markers, a detection map generated by the machine-learned object detection model. For instance, object detection model(s) 420 can generate a detection map of objectness data (e.g., using a task-specific output head, such as class head 612) indicating where in an input frame object(s) are likely to be located. In some implementations of example method 800, one or more portions of the machine-learned object detection model are configured to sparsely activate an output layer based on locations in the sensor data corresponding to the projected locations. For instance, object detection model(s) 420 can process foreground travel way markers to regress spatial region data with respect to those foreground travel way markers.

At 808, example method 800 can include generating, using the machine-learned object detection model, an offset with respect to the one or more travel way markers of a spatial region of the environment associated with the object.

In some implementations, example method 800 at 808 can include determining an offset of a centroid of a boundary of the spatial region and determining one or more dimensions of the boundary. For instance, object detection model(s) 420 can regress offsets to a centroid of a boundary around an object for each of one or more projected travel way markers that are associated with that object. In some implementations, example method 800 at 808 can include determining a first offset of a centroid of a first boundary of the spatial region in two dimensions and determining a second offset of a centroid of a second boundary of the spatial region in three dimensions. For instance, one or more first offsets can be determined in a sensor coordinate frame (e.g., in a frame aligned with a width and a height of an image). A second offset can be determined for a dimension into the frame (e.g., in a depth dimension).

In some implementations, example method 800 can include, based on determining that a velocity of the object is below a threshold, outputting a characteristic for the object indicating that the object is a static object. In some implementations, example method 800 can include outputting the characteristic to a motion planning system of the autonomous vehicle. For instance, a motion planning system can plan a motion for the autonomous vehicle based on an understanding that the detected object is a static object (e.g., a parked vehicle on a shoulder, such as a parked emergency vehicle).

In some implementations, example method 800 can include, based on determining that a velocity of the object is below a threshold and that the object is located adjacent to a travel way in the environment, outputting a characteristic for the object indicating that the object is a static object (e.g., on a shoulder of a roadway). In some implementations, example method 800 can include outputting the characteristic to a motion planning system of the autonomous vehicle.

In some implementations of example method 800, the spatial region of the environment is beyond an effective range of a LIDAR sensor of the autonomous vehicle. For instance, the object detection model can output object detections with spatial region data anchored to three-dimensional map data without relying on real-time LIDAR scans reliably providing returns on the object.

In some implementations, example method 800 can include identifying a lane in which the object is located. For instance, object detection model(s) 420 can regress offsets based on projected travel way markers. Map data can associate the travel way markers with a particular lane or lane type. Example method 800 can include identifying the lane based on this association.

In some implementations of example method 800, the machine-learned object detection model was trained using training sensor data having a training field of view and training travel way markers having a training resolution. For instance, training sensor data can be characterized by a first camera configuration (e.g., with a first field of view, a first resolution, etc.). In some implementations of example method 800, the sensor data (e.g., at runtime) is associated with a runtime field of view. The runtime field of view can be the same as or different than the training field of view. Accordingly, the travel way markers can be obtained at a runtime resolution selected based on a comparison of the training field of view and the runtime field of view.

In this manner, for instance, the range invariance of example implementations of the present disclosure can enable transfer learning. Transfer learning can include training on one sensor configuration and running at inference time using a different sensor configuration.

Normalizing a distribution of map data with respect to the resolution of the sensor can facilitate transfer learning. For instance, generally matching a distribution of map data markers for objects of similar size between the different configurations can help improve transfer learning. For instance, a first camera configuration can represent a given object with a first number of pixels. Map data can be sampled at a first resolution such that a first number of map markers fall on the object. A second camera configuration can represent the same object with a second number of pixels. Accordingly, map data can be sampled at a second resolution such that a second number of map markers fall on the object. For instance, the second resolution can be selected such that the second number matches the first number. Matching the distribution of map points can allow the object detection model(s) to operate on different sensor configurations. One approach to determining a scaling factor for the range of map points is to determine a ratio of the number of pixels that represent a unit height at a given distance (e.g., the ratio can provide the scaling factor).

In some implementations, example method 800 can include determining a projection error or pose error for the projected travel way markers. This can be used to recalibrate the projection operation. For instance, example method 800 can include projecting, using a projection transform, the travel way markers into a reference frame of the sensor data. In some implementations, example method 800 can include determining one or more offsets of the spatial region with respect to the travel way marker. In some implementations, example method 800 can include, based on the determined one or more offsets, determining a projection error for the projected travel way markers. In some implementations, example method 800 can include recalibrating the projection transform based on the determined projection error.

In some implementations of example method 800, example method 800 includes obtaining ground truth travel way marker labels indicating a ground truth association between the object and one or more of the travel way markers and determining, based on comparing the object data and the ground truth travel way marker labels, a sparse loss for the machine-learned object detection model. For instance, a sparse loss can be computed by ignoring portions of the sensor data that are not associated with a travel way marker (e.g., a projected travel way marker). In some implementations of example method 800, example method 800 includes training the machine-learned object detection model based on the sparse loss.

Figure 9:
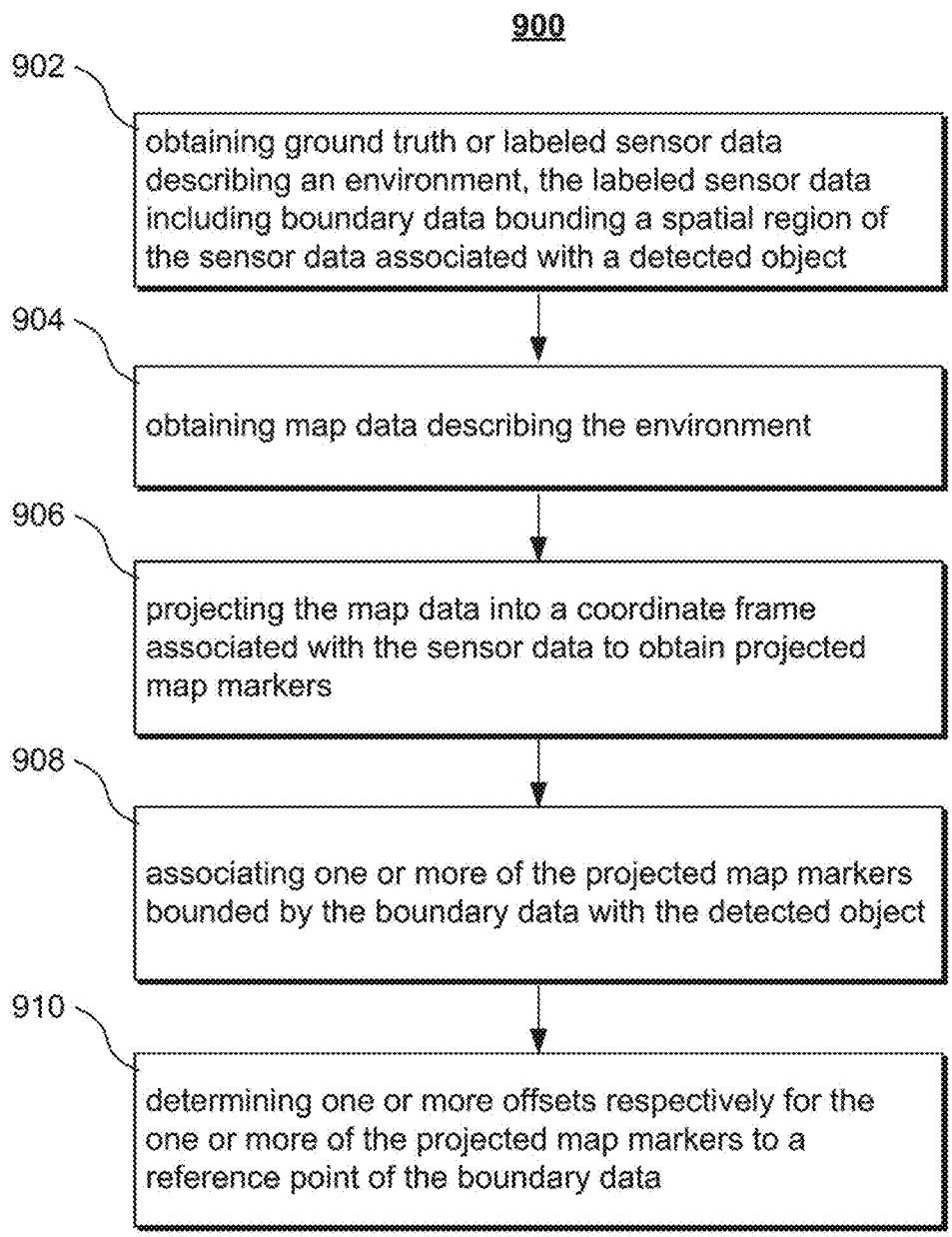
FIG. 9 is a flowchart of an example method for object detection, according to some implementations of the present disclosure.

FIG. 9 provides more detail for obtaining ground truth training data. FIG. 9 is a flowchart of method 900 for generating ground truth training data for training object detection model(s) according to aspects of the present disclosure. One or more portion(s) of the method 900 can be implemented by a computing system that includes one or more computing devices such as, for example, the computing systems described with reference to the other figures (e.g., autonomous platform 110, vehicle computing system 180, remote system(s) 160, a system of FIG. 11, etc.). Each respective portion of the method 900 can be performed by any (or any combination) of one or more computing devices. Moreover, one or more portion(s) of method 900 can be implemented on the hardware components of the device(s) described herein (e.g., as in FIGS. 1, 2, 11, etc.).

FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

At 902, example method 900 can include obtaining ground truth or labeled sensor data describing an environment, the labeled sensor data including spatial region data bounding a spatial region of the sensor data associated with a detected object. For instance, labeled sensor data can include labeled image captures. Labeled image captures can include frames of a video recording. Labeled sensor data can include sensor data that has been automatically or manually reviewed and annotated with one or more labels. Labeled sensor data can be obtained from log data from real or simulated driving sessions.

At 904, example method 900 can include obtaining map data describing the environment. The map data can include real or simulated map data (e.g., real scans of an environment, simulated scans of a synthetic environment, synthesized environment data, etc.). The map data can include one or more layers of data. The map data can include data describing a path of a travel way, such as a lane. The map data can be continuous. The map data can be sampled to obtain discrete markers indicating, for instance, a reference curve for a travel way (e.g., a lane centerline, a lane boundary, etc.). The map data can include ground surface data.

At 906, example method 900 can include projecting the map data into a coordinate frame associated with the sensor data to obtain projected map markers. For instance, a projection transform can be used to project three-dimensional map data into a two-dimensional sensor coordinate frame. In this manner, for instance, the map data can be registered to the labeled sensor data.

At 908, example method 900 can include associating one or more of the projected map markers bounded by the spatial region data with the detected object. For instance, even prior to projection, any three-dimensional labels can be correlated to a corresponding location in the map data. For instance, a labeled three-dimensional bounding box can be localized within map data and any map points falling within the three-dimensional bounding box can be associated with the detected object. The projected markers corresponding to those map points can thus be associated with the object as well. Further, additional projected map markers can project within a spatial region of the sensor data bounded by the spatial region data. For instance, projected markers can fall within a labeled two-dimensional bounding box defined in the sensor coordinate frame. These additional projected markers can be associated with the detected object.

For instance, one example technique is to, for an associated 2D/3D pair, find all map data points inside a volume formed by the base of a labeled 3D box polygon. These map data points can be projected into the sensor data frame. The remaining points/markers can be found within the height of the 2D box. These points can all be assigned the class associated with the labeled box.

At 910, example method 900 can include determining one or more offsets respectively for the one or more of the projected map markers to a reference point of the spatial region data. For instance, a reference point of the spatial region data can include a centroid of a bounding box (2D, 3D, or both) described by the spatial region data. The offsets can include two- or three-dimensional distances between each associated marker and the reference point.

A training dataset can include the determined offsets, the association of the map markers to the object(s), as well as the labeled spatial region data (e.g., dimensions of the bounding box). The training dataset can include an ego vehicle orientation, a sensor capture orientation, etc.

Figure 10:
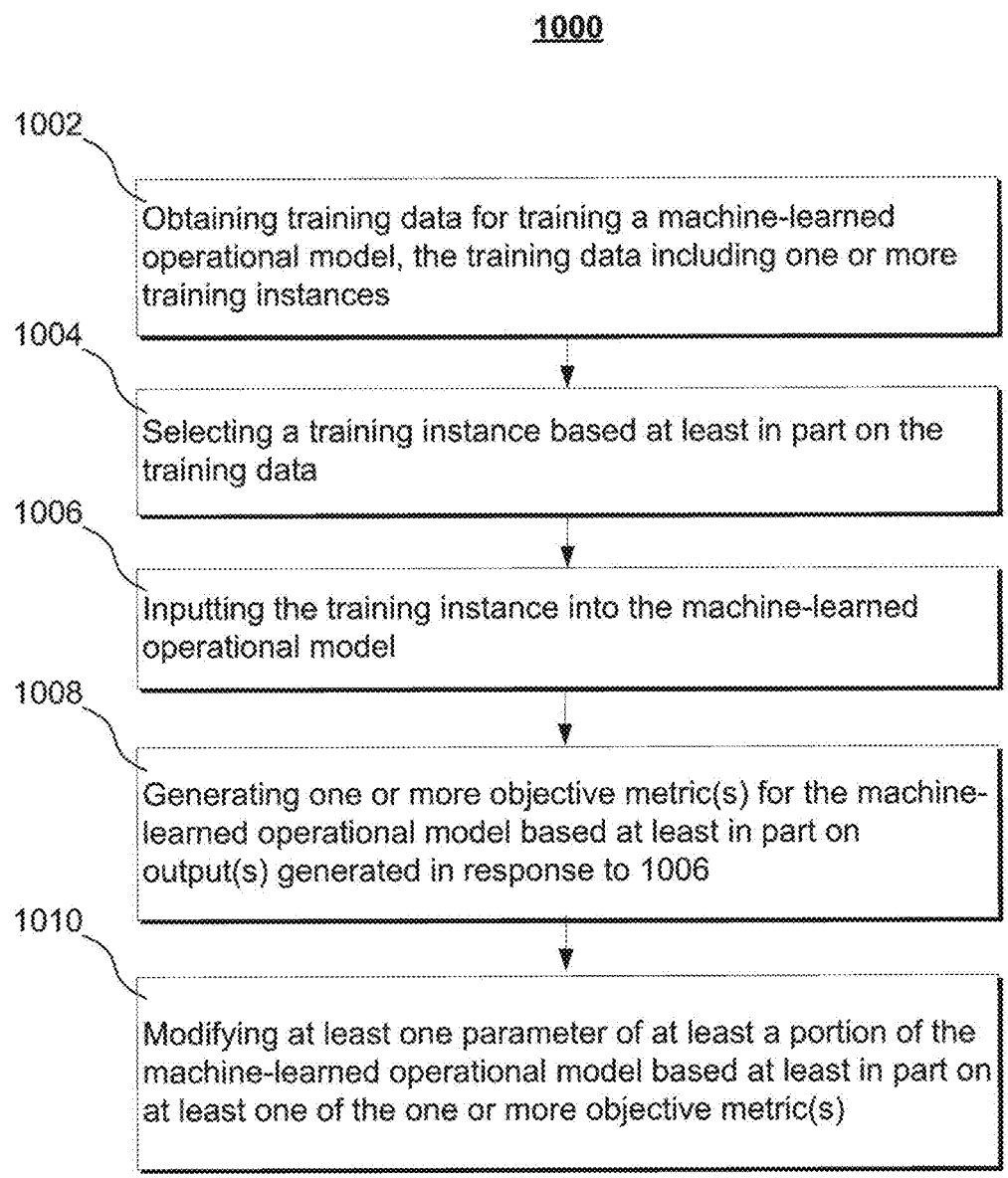
FIG. 10 is a flowchart of an example method for training a machine-learned operational system for object detection, according to some implementations of the present disclosure.

FIG. 10 depicts a flowchart of method 1000 for training one or more machine-learned operational models (e.g., an object detection model) according to aspects of the present disclosure. One or more portion(s) of the method 1000 can be implemented by a computing system that includes one or more computing devices such as, for example, the computing systems described with reference to the other figures (e.g., autonomous platform 110, vehicle computing system 180, remote system(s) 160, a system of FIG. 11, etc.). Each respective portion of the method 1000 can be performed by any (or any combination) of one or more computing devices. Moreover, one or more portion(s) of method 1000 can be implemented on the hardware components of the device(s) described herein (e.g., as in FIGS. 1, 2, 11, etc.), for example, to validate one or more systems or models.

FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 10 is described with reference to elements/terms described with respect to other systems and figures for exemplary illustrated purposes and is not meant to be limiting. One or more portions of method 1000 can be performed additionally, or alternatively, by other systems.

At 1002, method 1000 can include obtaining training data for training a machine-learned operational model. The training data can include a plurality of training instances. The training data can include data generated according to example method 900.

The training data can be collected using one or more autonomous platforms (e.g., autonomous platform 110) or the sensors thereof as the autonomous platform is within its environment. By way of example, the training data can be collected using one or more autonomous vehicle(s) (e.g., autonomous platform 110, autonomous vehicle 310, autonomous vehicle 350, etc.) or sensors thereof as the vehicle(s) operates along one or more travel ways. In some examples, the training data can be collected using other sensors, such as mobile-device-based sensors, ground-based sensors, aerial-based sensors, satellite-based sensors, or substantially any sensor interface configured for obtaining and/or recording measured data.

The training data can include a plurality of training sequences divided between multiple datasets (e.g., a training dataset, a validation dataset, or testing dataset). Each training sequence can include a plurality of pre-recorded perception datapoints, point clouds, images, etc. In some implementations, each sequence can include LIDAR point clouds (e.g., collected using LIDAR sensors of an autonomous platform), images (e.g., collected using mono or stereo imaging sensors, etc.), and the like. For instance, in some implementations, a plurality of images can be scaled for training and evaluation.

At 1004, method 1000 can include selecting a training instance based at least in part on the training data.

At 1006, method 1000 can include inputting the training instance into the machine-learned operational model.

At 1008, the method 1000 can include generating one or more loss metric(s) and/or one or more objective(s) for the machine-learned operational model based on output(s) of at least a portion of the machine-learned operational model and label(s) associated with the training instances.

Foreground data (e.g., foreground data 430) can be used to mask the loss computation. For instance, map markers that are not associated with a projected map marker are excluded from the loss. For instance, a plurality of map markers can be projected onto an image. Pixels that are not associated with a projected marker (e.g., lie outside of a threshold distance from the marker) can be excluded from a calculation of a loss (e.g., a weight associated with the portion of the sensor data can be set to zero).

At 1010, method 1000 can include modifying at least one parameter of at least a portion of the machine-learned operational model based at least in part on at least one of the loss metric(s) and/or at least one of the objective(s). For example, a computing system can modify at least a portion of the machine-learned operational model based at least in part on at least one of the loss metric(s) and/or at least one of the objective(s).

In some implementations, the machine-learned operational model can be trained in an end-to-end manner. For example, in some implementations, the machine-learned operational model can be fully differentiable.

After being updated, the operational model or the operational system including the operational model can be provided for validation by a validation system. In some implementations, the validation system can evaluate or validate the operational system. The validation system can trigger retraining, decommissioning, etc. of the operational system based on, for example, failure to satisfy a validation threshold in one or more areas.

Figure 11:
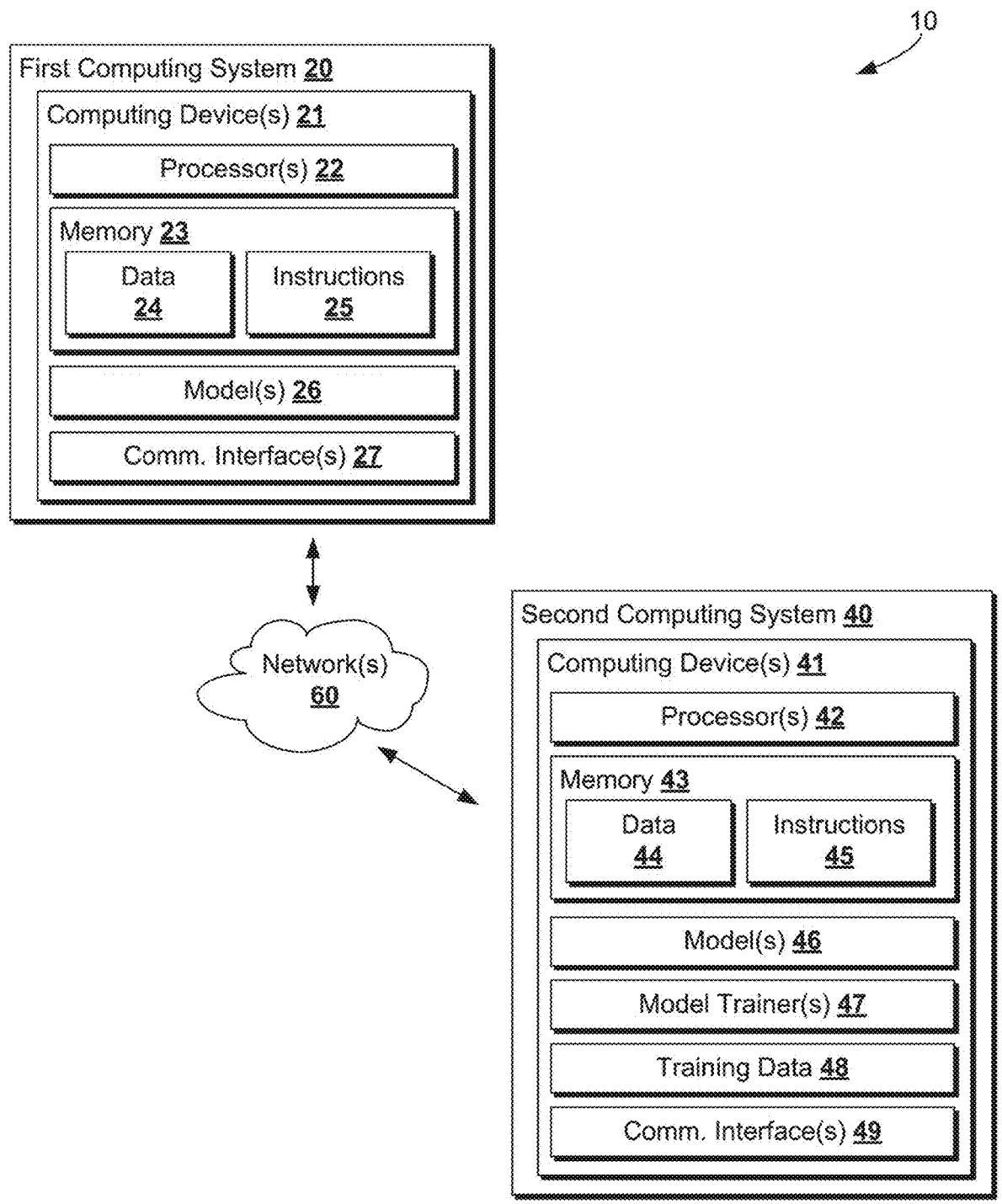
FIG. 11 is a block diagram of an example computing system for object detection, according to some implementations of the present disclosure.

FIG. 11 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing 40 can implement one or more of the systems, operations, or functionalities described herein for validating one or more systems or operational systems (e.g., the remote system(s) 160, the onboard computing system(s) 180, the autonomy system(s) 200, etc.).

In some implementations, the first computing system 20 can be included in an autonomous platform and be utilized to perform the functions of an autonomous platform as described herein. For example, the first computing system 20 can be located onboard an autonomous vehicle and implement autonomy system(s) for autonomously operating the autonomous vehicle. In some implementations, the first computing system 20 can represent the entire onboard computing system or a portion thereof (e.g., the localization system 230, the perception system 240, the planning system 250, the control system 260, or a combination thereof, etc.). In other implementations, the first computing system 20 may not be located onboard an autonomous platform. The first computing system 20 can include one or more distinct physical computing devices 21.

The first computing system 20 (e.g., the computing device(s) 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. Memory 23 can include one or more non-transitory computer-readable storage media, such as RAM, ROM, EEPROM, EPROM, one or more memory devices, flash memory devices, etc., and combinations thereof.

Memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data, map data, data associated with autonomy functions (e.g., data associated with the perception, planning, or control functions), simulation data, or any data or information described herein. In some implementations, the first computing system 20 can obtain data from one or more memory device(s) that are remote from the first computing system 20.

Memory 23 can store computer-readable instructions 25 that can be executed by the one or more processors 22. Instructions 25 can be software written in any suitable programming language or can be implemented in hardware. Additionally, or alternatively, instructions 25 can be executed in logically or virtually separate threads on the processor(s) 22.

For example, the memory 23 can store instructions 25 that are executable by one or more processors (e.g., by the one or more processors 22, by one or more other processors, etc.) to perform (e.g., with the computing device(s) 21, the first computing system 20, or other system(s) having processors executing the instructions) any of the operations, functions, or methods/processes (or portions thereof) described herein. For example, operations can include implementing system validation (e.g., as described herein).

In some implementations, the first computing system 20 can store or include one or more models 26. In some implementations, the models 26 can be or can otherwise include one or more machine-learned models (e.g., a machine-learned operational system, etc.). As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more models for implementing subsystems of the autonomy system(s) 200, including any of: the localization system 230, the perception system 240, the planning system 250, or the control system 260.

In some implementations, the first computing system 20 can obtain the one or more models 26 using communication interface(s) 27 to communicate with the second computing system 40 over the network(s) 60. For instance, the first computing system 20 can store the model(s) 26 (e.g., one or more machine-learned models) in memory 23. The first computing system 20 can then use or otherwise implement the models 26 (e.g., by the processors 22). By way of example, the first computing system 20 can implement the model(s) 26 to localize an autonomous platform in an environment, perceive an autonomous platform's environment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

Memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, sensor data, model parameters, map data, simulation data, simulated environmental scenes, simulated sensor data, data associated with vehicle trips/services, or any data or information described herein. In some implementations, the second computing system 40 can obtain data from one or more memory device(s) that are remote from the second computing system 40.

Memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processor(s) 42.

For example, memory 43 can store instructions 45 that are executable (e.g., by the one or more processors 42, by the one or more processors 22, by one or more other processors, etc.) to perform (e.g., with the computing device(s) 41, the second computing system 40, or other system(s) having processors for executing the instructions, such as computing device(s) 21 or the first computing system 20) any of the operations, functions, or methods/processes described herein. This can include, for example, the functionality of the autonomy system(s) 200 (e.g., localization, perception, planning, control, etc.) or other functionality associated with an autonomous platform (e.g., remote assistance, mapping, fleet management, trip/service assignment and matching, etc.). This can also include, for example, validating a machined-learned operational system.

In some implementations, second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally, or alternatively to, the model(s) 26 at the first computing system 20, the second computing system 40 can include one or more models 46. As examples, the model(s) 46 can be or can otherwise include various machine-learned models (e.g., a machine-learned operational system, etc.) such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system(s) 200.

In some implementations, the second computing system 40 or the first computing system 20 can train one or more machine-learned models of the model(s) 26 or the model(s) 46 through the use of one or more model trainers 47 and training data 48. The model trainer(s) 47 can train any one of the model(s) 26 or the model(s) 46 using one or more training or learning algorithms. One example training technique is backwards propagation of errors. In some implementations, the model trainer(s) 47 can perform supervised training techniques using labeled training data. In other implementations, the model trainer(s) 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer(s) 47 for training or testing the model(s) 26 or the model(s) 46. By way of example, the model trainer(s) 47 can train one or more components of a machine-learned model for the autonomy system(s) 200 through unsupervised training techniques using an objective function (e.g., costs, rewards, heuristics, constraints, etc.). In some implementations, the model trainer(s) 47 can perform a number of generalization techniques to improve the generalization capability of the model(s) being trained. Generalization techniques include weight decays, dropouts, or other techniques.

For example, in some implementations, the second computing system 40 can generate training data 48 according to example aspects of the present disclosure. For instance, the second computing system 40 can generate training data 48. For instance, the second computing system 40 can implement methods according to example aspects of the present disclosure. The second computing system 40 can use the training data 48 to train model(s) 26. For example, in some implementations, the first computing system 20 can include a computing system onboard or otherwise associated with a real or simulated autonomous vehicle. In some implementations. model(s) 26 can include perception or machine vision model(s) configured for deployment onboard or in service of a real or simulated autonomous vehicle. In this manner, for instance, the second computing system 40 can provide a training pipeline for training model(s) 26.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network(s) 60). In some implementations, the communication interfaces 27, 49 can include, for example, one or more of a communications controller, receiver, transceiver, transmitter, port, conductors, software, or hardware for communicating data.

The network(s) 60 can be any type of network or combination of networks that allows for communication between devices. In some implementations, the network(s) can include one or more of a local area network, wide area network, the Internet, secure network, cellular network, mesh network, peer-to-peer communication link or some combination thereof and can include any number of wired or wireless links. Communication over the network(s) 60 can be accomplished, for instance, through a network interface using any type of protocol, protection scheme, encoding, format, packaging, etc.

FIG. 11 illustrates one example computing ecosystem 10 that can be used to implement the present disclosure. Other systems can be used as well. For example, in some implementations, the first computing system 20 can include the model trainer(s) 47 and the training data 48. In such implementations, the model(s) 26, 46 can be both trained and used locally at the first computing system 20. As another example, in some implementations, the computing system 20 may not be connected to other computing systems. Additionally, components illustrated or discussed as being included in one of the computing systems 20 or 40 can instead be included in another one of the computing systems 20 or 40.

Computing tasks discussed herein as being performed at computing device(s) remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . (i), (ii), (iii), ..., etc. can be used to illustrate operations. Such identifiers are provided for the case of the reader and do not denote a particular order of steps or operations. An operation illustrated by a list identifier of (a). (i), etc. can be performed before. after, or in parallel with another operation illustrated by a list identifier of (b), (ii), etc.

What is claimed is:

1. A computer-implemented method, comprising:
   (a) obtaining sensor data descriptive of an environment of an autonomous vehicle;
   (b) obtaining a plurality of travel way markers from map data descriptive of the environment;
   (c) determining, using a machine-learned object detection model and based on the sensor data, an association between one or more travel way markers of the plurality of travel way markers and an object in the environment; and
   (d) generating, using the machine-learned object detection model, an offset with respect to the one or more travel way markers of a spatial region of the environment associated with the object;
   wherein (c) comprises:
      inputting the travel way markers and the sensor data to the machine-learned object detection model; and
      obtaining object data from the machine-learned object detection model at projected locations of the travel way markers in a reference frame of the sensor data, wherein the object data indicates that the object is likely to be present at a projected location of the one or more travel way markers.

2. The computer-implemented method of claim 1, wherein the travel way markers include lane markers.

3. The computer-implemented method of claim 2, wherein the lane markers comprise centerline markers.

4. The computer-implemented method of claim 1, wherein obtaining the object data comprises subsampling, based on the travel way markers, a detection map generated by the machine-learned object detection model.

5. The computer-implemented method of claim 1, wherein one or more portions of the machine-learned object detection model are configured to sparsely use portions of an output layer based on locations in the sensor data corresponding to the projected locations.

6. The computer-implemented method of claim 1, wherein the machine-learned object detection model is trained by:
   obtaining ground truth travel way marker labels indicating a ground truth association between the object and one or more of the travel way markers; and
   determining, based on comparing the object data and the ground truth travel way marker labels, a sparse loss for the machine-learned object detection model.

7. The computer-implemented method of claim 1, wherein (d) comprises:
   determining an offset of a centroid of a boundary of the spatial region; and
   determining one or more dimensions of the boundary.

8. The computer-implemented method of claim 1, wherein (d) comprises:
   determining a first offset of a centroid of a first boundary of the spatial region in two dimensions; and
   determining a second offset of a centroid of a second boundary of the spatial region in three dimensions.

9. The computer-implemented method of claim 1, comprising:
   based on determining that a velocity of the object is below a threshold, outputting a characteristic for the object indicating that the object is a static object; and
   outputting the characteristic to a motion planning system of the autonomous vehicle.

10. The computer-implemented method of claim 1, comprising:
    based on determining that a velocity of the object is below a threshold and that the object is located adjacent to a travel way in the environment, outputting a characteristic for the object indicating that the object is a static object; and
    outputting the characteristic to a motion planning system of the autonomous vehicle.

11. The computer-implemented method of claim 1, wherein (b) comprises:
    sampling discrete travel way markers from continuous travel way map data.

12. The computer-implemented method of claim 1, wherein the spatial region of the environment is beyond an effective range of a LIDAR sensor of the autonomous vehicle.

13. The computer-implemented method of claim 1, wherein:
    the machine-learned object detection model was trained using training sensor data having a training field of view and training travel way markers having a training resolution;
    the sensor data is associated with a runtime field of view; and
    the travel way markers are obtained in (c) at a runtime resolution selected based on a comparison of the training field of view and the runtime field of view.

14. The computer-implemented method of claim 1, comprising:
    projecting, using a projection transform, the travel way markers into a reference frame of the sensor data;
    determining one or more offsets of the spatial region with respect to the travel way markers;
    based on the determined one or more offsets, determining a projection error for the projected travel way markers; and
    recalibrating the projection transform based on the determined projection error.

15. The computer-implemented method of claim 1, comprising:
    identifying a lane in which the object is located based on the one or more travel way markers.

16. The computer-implemented method of claim 1, wherein (d) comprises:
    regressing, by the machine-learned object detection model, the offset.

17. An autonomous vehicle control system for controlling an autonomous vehicle, the autonomous vehicle control system comprising:
    one or more processors; and
    one or more non-transitory computer-readable media storing instructions that are executable by the one or more processors to cause the autonomous vehicle control system to perform operations, the operations comprising:
    (a) obtaining sensor data descriptive of an environment of the autonomous vehicle;
    (b) obtaining a plurality of travel way markers from map data descriptive of the environment;

(c) determining, using a machine-learned object detection model and based on the sensor data, an association between one or more travel way markers of the plurality of travel way markers and an object in the environment; and (d) generating, using the machine-learned object detection model, an offset with respect to the one or more travel way markers of a spatial region of the environment associated with the object;

wherein (c) comprises:
   inputting the travel way markers and the sensor data to the machine-learned object detection model; and
   obtaining object data from the machine-learned object detection model at projected locations of the travel way markers in a reference frame of the sensor data, wherein the object data indicates that the object is likely to be present at a projected location of the one or more travel way markers.

18. The autonomous vehicle control system of claim 17, wherein obtaining the object data comprises subsampling, based on the travel way markers, a detection map generated by the machine-learned object detection model.

19. The autonomous vehicle control system of claim 17, wherein (d) comprises:
   determining a first offset of a centroid of a first boundary of the spatial region in two dimensions; and
   determining a second offset of a centroid of a second boundary of the spatial region in three dimensions.

20. The autonomous vehicle control system of claim 17, wherein the machine-learned object detection model is trained by:
   obtaining ground truth travel way marker labels indicating a ground truth association between the object and one or more of the travel way markers; and
   determining, based on comparing the object data and the ground truth travel way marker labels, a sparse loss for the machine-learned object detection model.

21. One or more non-transitory computer-readable media storing instructions that are executable by one or more processors to cause an autonomous vehicle control system to perform operations, the operations comprising:
   (a) obtaining sensor data descriptive of an environment of an autonomous vehicle;
   (b) obtaining a plurality of travel way markers from map data descriptive of the environment;
   (c) determining, using a machine-learned object detection model and based on the sensor data, an association between one or more travel way markers of the plurality travel way markers and an object in the environment; and
   (d) generating, using the machine-learned object detection model, an offset with respect to the one or more travel way markers of a spatial region of the environment associated with the object;
   wherein (c) comprises:
      inputting the travel way markers and the sensor data to the machine-learned object detection model; and
      obtaining object data from the machine-learned object detection model at projected locations of the travel way markers in a reference frame of the sensor data, wherein the object data indicates that the object is likely to be present at a projected location of the one or more travel way markers.

* * * * *